US010120939B2

(12) United States Patent
Prabhu et al.

(10) Patent No.: US 10,120,939 B2
(45) Date of Patent: Nov. 6, 2018

(54) DETECTING AND USING MOOD-CONDITION AFFINITIES

(71) Applicant: AT&T Intellectual Property I, L.P., Atlanta, GA (US)

(72) Inventors: Krish Anant Prabhu, Plano, TX (US); Ari Craine, Marietta, GA (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 256 days.

(21) Appl. No.: 14/971,081

(22) Filed: Dec. 16, 2015

(65) Prior Publication Data
US 2017/0177721 A1    Jun. 22, 2017

(51) Int. Cl.
    *G06F 17/30*      (2006.01)
    *G06Q 50/00*      (2012.01)

(52) U.S. Cl.
    CPC ....... *G06F 17/30864* (2013.01); *G06Q 50/01* (2013.01)

(58) Field of Classification Search
    USPC ........................................................ 709/201
    See application file for complete search history.

(56) References Cited

U.S. PATENT DOCUMENTS

| | | |
|---|---|---|
| 7,092,892 B1 | 8/2006 | Sobalvarro et al. |
| 7,206,775 B2 | 4/2007 | Kaiser et al. |
| 7,644,012 B2 | 1/2010 | Ishigai et al. |
| 8,453,165 B2 | 5/2013 | McKinney |
| 8,583,674 B2 | 11/2013 | Zheleva et al. |
| 8,832,062 B1 | 9/2014 | Pedregal et al. |
| 2011/0191352 A1 | 8/2011 | Jones et al. |
| 2013/0246388 A1 | 9/2013 | Benini |
| 2014/0282586 A1 | 9/2014 | Shear et al. |

OTHER PUBLICATIONS

Gupta et al., "MobiSoC: A Middleware for Mobile Social Computing Applications," ACM/Springer Mobile Networks and Applications (MONET) Journal, Feb. 2009, vol. 14, Issue 1.

*Primary Examiner* — Vivek Srivastava
*Assistant Examiner* — Hien Doan
(74) *Attorney, Agent, or Firm* — Hartman & Citrin LLC

(57) ABSTRACT

Concepts and technologies are disclosed herein for detecting and using mood-condition affinities. A processor that executes an affinity service or affinity application can obtain collected data associated with a user device. The collected data can include sensor readings collected by the user device. The processor can determine a condition at the user device and a mood associated with the condition. The processor can generate an affinity that defines a relationship between the condition and the mood and store the affinity at a data storage device.

18 Claims, 15 Drawing Sheets

DETECTING AND USING MOOD-CONDITION AFFINITIES

BACKGROUND

Over the past several years, there has been a huge growth in the use of portable computing devices such as smartphones. Most modern consumers use portable computing devices such as smartphones not only for communication, but also for emailing, web browsing, social networking applications, taking photographs and videos, health applications, business applications, and other purposes. With the proliferation of these devices, modern communication networks have increased their capabilities to support high bandwidth data connections, simultaneous voice and data support, and other innovations to provide an "always on" networking capability for these devices.

Because these devices enjoy almost constant access to the Internet and continuously improving capabilities, many new tools and applications have been enabled and now are used by most modern consumers. The combination of a proliferation of these devices, applications for these devices, increases in computing power, and improvement in connectivity capabilities of these devices has resulted in an overall advancement of technology that has enabled new interactions between users and information. Many tasks are now done using smartphones or other portable computing devices that until recently were either done manually or using dedicated desktop computer.

SUMMARY

The present disclosure is directed to detecting and using mood-condition affinities (also referred to herein simply as an "affinity"). As used herein, an "affinity" can be used to refer to an association between a condition and a mood. The affinities can be determined by detecting events at various devices, determining conditions when the events are detected, and determining a mood associated with the event. Various types of data can be used to determine the conditions and mood, and the affinities can be generated based on these data. The affinities can be stored and used to project mood and/or for other purposes.

A computing device such as a smartphone can access sensors and/or off-board devices to collect sensor readings. The sensor readings can be analyzed by an affinity application or affinity service to determine conditions at or near the computing device. The sensors and/or off-board sensors also can capture biometric data associated with a user or other entity. The biometric data can be analyzed by the affinity application or the affinity service to determine a mood and/or emotion ("mood") associated with the user or other entity. The mood can be associated with the conditions to create an affinity between certain moods and conditions. Affinity data can be generated to relay these affinities (or aspects of the affinities) to users or other entities. The affinity data can be used for various personal and/or business purposes. In some embodiments, the affinity data can be used to help improve mood; to avoid conditions or events that tend to negatively impact mood; to plan for interactions, transactions, or events with certain people, places, or things; and/or for other purposes.

According to one aspect of the concepts and technologies disclosed herein, a system is disclosed. The system can include a processor and a memory. The memory can store computer-executable instructions that, when executed by the processor, cause the processor to perform operations. The operations can include obtaining collected data associated with a user device. The collected data can include sensor readings collected by the user device. The operations also can include determining a condition at the user device and a mood associated with the condition, generating an affinity that defines a relationship between the condition and the mood, and storing the affinity at a data storage device.

In some embodiments, the computer-executable instructions, when executed by the processor, cause the processor to perform additional operations. The additional operations can include detecting an event associated with the user device and requesting the collected data in response to detecting the event. In some embodiments, the system also can include sensors located at the user device and off-board devices in communication with the user device. The off-board devices can include a camera and the sensors can include biometric sensors. In some embodiments, the collected data further can include biometric data. Determining the mood can include analyzing the biometric data to determine the mood.

In some embodiments, determining the mood can include comparing the biometric data to mood information stored with the affinity and determining, based upon the comparing, the mood. In some embodiments, the computer-executable instructions, when executed by the processor, cause the processor to perform additional operations. The additional operations can include receiving, from a requestor, a request for affinity data; determining another condition that is associated with the requestor; identifying another affinity associated with the other condition; and providing the affinity data to a recipient, the affinity data being based upon the other affinity.

In some embodiments, providing the affinity data to the recipient can include providing a social networking status update to the recipient. The social networking status update can indicate the further condition and a further mood projected for the requestor. In some embodiments, providing the affinity data to the recipient can include providing an alert that relates to an event to the requestor. The event can be associated with the requestor. In some embodiments, receiving the request for the affinity data includes obtaining further collected data from the requestor; determining the further condition; and determining, by the processor and based on the further condition, that affinity data should be provided to the recipient.

According to another aspect of the concepts and technologies disclosed herein, a computer storage medium is disclosed. The computer storage medium can have computer-executable instructions stored thereon. When the computer-executable instructions are executed by a processor, the processor can perform operations including obtaining collected data associated with a user device. The collected data can include sensor readings collected by the user device. The operations also can include determining a condition at the user device and a mood associated with the condition; generating an affinity that defines a relationship between the condition and the mood; and storing the affinity at a data storage device.

In some embodiments, the collected data further can include biometric data. Determining the mood can include analyzing the biometric data to determine the mood. In some embodiments, the computer-executable instructions, when executed by the processor, cause the processor to perform operations that further can include receiving, from a requestor, a request for affinity data; determining a further condition that is associated with the requestor; identifying a further affinity associated with the further condition; and providing the affinity data to a recipient, the affinity data being based upon the further affinity. In some embodiments, receiving the request for the affinity data can include obtaining further collected data from the requestor; determining the further condition; and determining, by the processor and based on the further condition, that affinity data should be provided to the recipient.

According to yet another aspect, a method is disclosed. The method can include obtaining, at a processor that executes an affinity service, collected data associated with a user device. The collected data can include sensor readings collected by the user device. The method also can include determining, by the processor, a condition at the user device and a mood associated with the condition; generating, by the processor, an affinity that defines a relationship between the condition and the mood; and storing, by the processor, the affinity at a data storage device.

In some embodiments, the collected data further can include biometric data and determining the mood can include analyzing the biometric data to determine the mood. In some embodiments, determining the mood can include comparing the biometric data to mood information stored with the affinity and determining, based upon the comparing, the mood. In some embodiments, the method also can include receiving, by the processor and from a requestor, a request for affinity data; determining, by the processor, a further condition that is associated with the requestor; identifying, by the processor, a further affinity associated with the further condition; and providing, by the processor, the affinity data to a recipient, the affinity data being based upon the further affinity.

In some embodiments, providing the affinity data to the recipient can include providing a social networking status update to the recipient. The social networking status update can indicate the further condition and a further mood projected for the requestor. In some embodiments, providing the affinity data to the recipient can include providing an alert that relates to an event to the requestor. The event can be associated with the requestor. In some embodiments, receiving the request for the affinity data can include obtaining, by the processor, further collected data from the requestor; determining, by the processor, the further condition; and determining, by the processor and based on the further condition, that affinity data should be provided to the recipient.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to detecting and using mood-condition affinities. A computing device such as a smartphone can access sensors and/or off-board devices to collect sensor readings. The sensors and/or off-board sensors also can capture biometric data associated with a user or other entity. The sensor readings and biometric data can be analyzed at the computing device or provided to another device or service such as, for example, an affinity service that can be hosted and/or executed by a server computer or other device. The affinity service or an affinity application executed by the computing device can analyze the sensor readings to determine conditions at or near the computing device. The affinity service or affinity application also can analyze the biometric data to determine a mood and/or emotion ("mood") associated with the user or other entity. The mood can be associated with the conditions to create affinities between certain moods and conditions. The affinities can be stored in a manner that is searchable by any condition associated with the affinity.

When events are detected at a device, conditions associated with the event can be determined and used to search the affinities. Affinity data can be generated to relay relationships between the conditions and mood to users or other entities. The affinities also can be used to project mood based on the conditions. Thus, embodiments of the concepts and technologies described herein can be used to provide insight into how certain events, conditions, locations, times at locations, transactions, interactions, and/or other activities can affect mood of a user or other entity, to project mood based on upcoming or detected events, and for other purposes. Embodiments of the concepts and technologies described herein also can be used to provide information for improving mood of users or other entities and/or otherwise providing insight into various activities.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
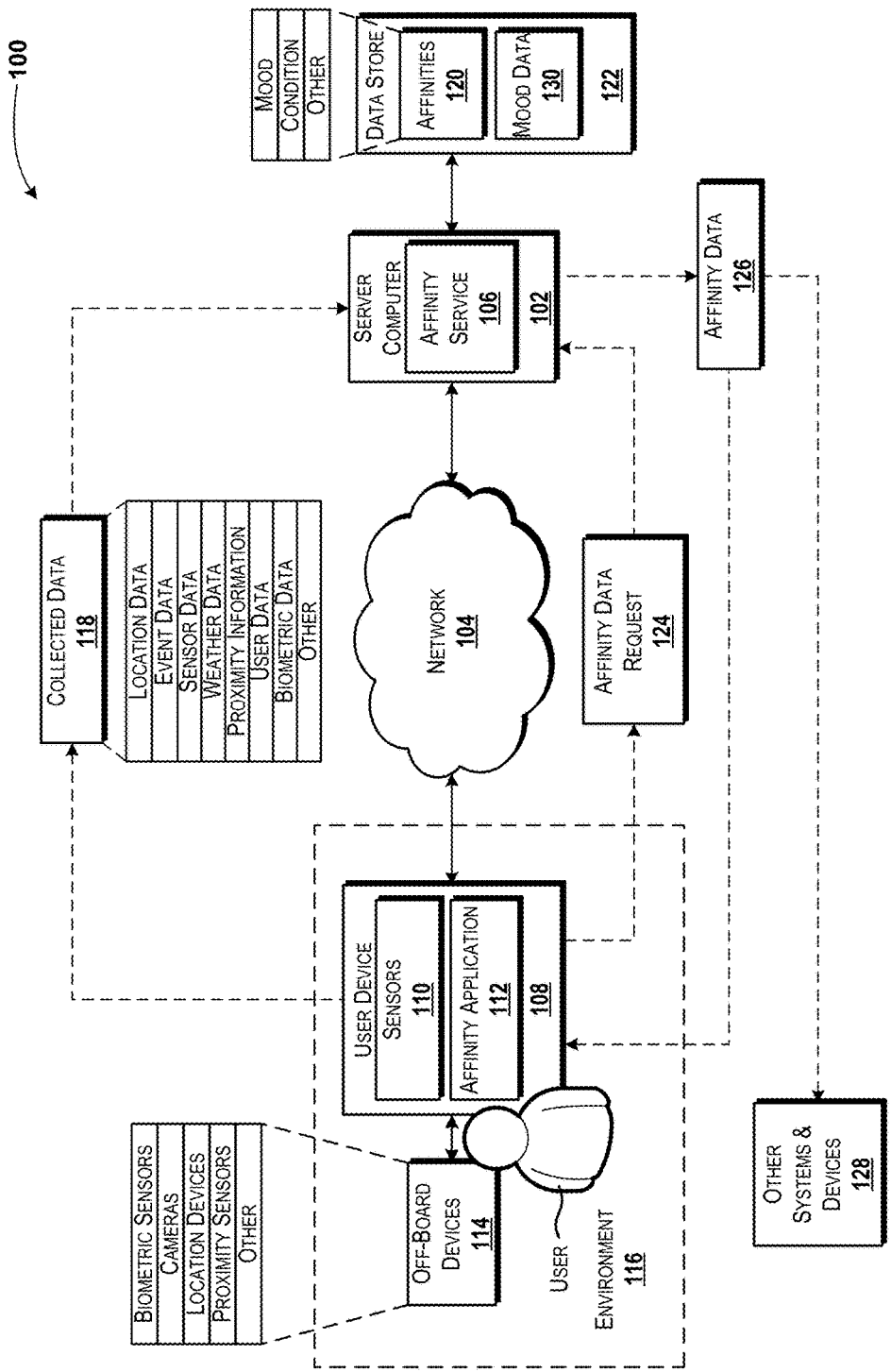
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for detecting and using mood-condition affinities will be described, according to an illustrative embodiment. The operating environment 100 shown in FIG. 1 includes a server computer 102. The server computer 102 can operate in communication with and/or as part of a communications network ("network") 104, though this is not necessarily the case in all embodiments and/or at all times.

According to various embodiments, the functionality of the server computer 102 may be provided by one or more server computers, desktop computers, mobile telephones, laptop computers, set-top boxes, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is generally described herein as a single server computer as one example embodiment that is easy to describe and to understand. It should be understood that this embodiment is illustrative, and should not be construed as being limiting in any way.

The server computer 102 can execute an operating system (not shown in FIG. 1) and one or more application programs such as, for example, an affinity service 106. The operating system can include a computer program that can control the operation of the server computer 102. The affinity service 106 can include an executable program that can be configured to execute on top of the operating system to provide various functions as illustrated and described herein. Before explaining the functionality of the affinity service 106, various other devices and entities shown in the operating environment 100 illustrated in FIG. 1 will be described.

The operating environment 100 also can include a user device 108. The user device 108 can include various types of computing devices. According to various embodiments of the concepts and technologies described herein, the functionality of the user device 108 may be provided by one or more mobile telephones, smartphones, tablet computers, slate computers, laptop computers, smart watches or other wearable computing devices, media players, other computing devices, and the like. It should be understood that the functionality of the user device 108 can be provided by a single device, by two similar devices, and/or by two or more dissimilar devices. For purposes of describing the concepts and technologies disclosed herein, the user device 108 is generally described herein as a smartphone. Based on the above, it should be understood that this embodiment is illustrative, and should not be construed as being limiting in any way.

The user device 108 can include one or more sensors 110. According to various embodiments of the concepts and technologies described herein, the sensors 110 can include a diverse set of sensors and/or sensing devices. The sensors 110 can be used in accordance with the concepts and technologies described herein to determine conditions associated with a user, a user device 108, and/or an area associated with a user or user device 108. Various contemplated sensors that can be included in the sensors 110 are illustrated and described herein, but should not be viewed as limiting. Briefly, the sensors 110 can include, but are not limited to, location sensors, time devices, proximity sensors, light sensors, audio sensors, heart rate sensors, pulse oximeters ("PulseOx"), sphygmomanometers, facial expression detectors, movement and/or orientation sensors, voice recognition devices, thermometers, barometers, humidity sensors, anemometers, vibration detection sensors, combinations thereof, or the like. These and other sensors will be discussed in more detail herein.

The user device 108 also can execute an operating system (not shown in FIG. 1) and one or more application programs such as, for example, an affinity application 112. The operating system can include a computer program that can control the operation of the user device 108 and the affinity application 112 can include an executable program that can be configured to execute on top of the operating system to provide various functions as illustrated and described herein.

According to various embodiments, the user device 108 can be configured, via execution of the affinity application 112 and/or other computer-executable instructions, to collect sensor readings and/or conditions information using the sensors 110 and/or other devices such as, for example, off-board devices 114. The off-board devices 114 can include various sensors including, but not limited to, those mentioned above with reference to the sensors 110. For example, the off-board devices 114 can include cameras, proximity sensors, various biometric devices, location devices, proximity sensors, payment systems (for detecting transactions or the like), combinations thereof, or the like. The off-board devices 114 also can include other types of sensors or devices such as location beacons, timers, traffic sensors, proximity sensors, and/or other devices including but not limited to those illustrated and described herein.

According to various embodiments, the off-board devices 114 can be owned and/or operated by (or at least accessible to) an entity that can control or offer the affinity service 106. In some contemplated embodiments, an entity that owns and/or operates the affinity service 106 can contract with various entities to access the off-board devices 114. When the user device 108 is in a vicinity of the off-board devices 114, for example in an environment 116 in which the user device 108 is located, the off-board devices 114 can be made available to the user device 108 and/or other entities to enable collection of sensor readings, audio data, video data, time information (e.g., duration at a location, duration involved in a transaction, etc.), location information, proximity information, biometric data, traffic information, and/or other types of data or information for use as illustrated and described herein. In some other embodiments, the off-board devices 114 can include wearable sensor arrays and/or wearable devices that can be located on or near the user or other entity. In yet other embodiments, the off-board devices 114 can include combinations of the above. It should be understood that these examples are illustrative and therefore should not be construed as being limiting in any way.

The affinity application 112 can be configured to monitor conditions, states, and events associated with a user or other entity (labeled "user" in FIG. 1) and/or an environment 116 in which the user device 108 and/or the user are located. According to various embodiments of the concepts and technologies described herein, the affinity application 112 can be executed by the user device 108 to detect events associated with the user device 108. These events can be detected in a number of manners such as, for example, detecting calendar events; detecting changes in state, location, or the like; detecting time at a location and/or in transaction; detecting an explicit indication of an event;

detecting proximity to other users; detecting music; detecting audio levels; detecting weather conditions; detecting transactions; combinations thereof; or the like.

According to various embodiments of the concepts and technologies described herein, an "event" is defined as a change in a state associated with a user or other entity. Thus, if a user or other entity moves to, from, and/or within a location; interacts with a certain person; hears music; eats a certain food; drinks a certain drink; engages in a particular transaction; attends a particular social event; has a particular facial expression; moves; stops moving; has particular vital signs; or the like; an event can be determined to have occurred by the affinity application 112 and/or the affinity service 106, as will be explained in more detail below. According to various embodiments of the concepts and technologies described herein, the affinity application 112 can be configured to detect events, to define information that can define events, and to collect data such as sensor readings, location, weather data, etc. when the events are detected. According to various embodiments of the concepts and technologies described herein, the affinity application 112 can be configured to collect information defining conditions at or near the environment 116 and provide the information to the affinity service 106 as the collected data 118.

As shown in FIG. 1, the collected data 118 can include, but is not limited to, location data (e.g., geographic coordinates that define a location, places of business associated with the location, contact information associated with the location, and the like); event data (e.g., types of events detected such as entering a place of business, being involved with a transaction, going to sleep, speaking on the phone, or the like); sensor data (e.g., sensor readings associated with one or more of the sensors 110 and/or the off-board devices 114); weather data (e.g., temperature, pressure, wind speed, light levels, humidity, and the like); proximity information (e.g., devices, people, objects, or other entities near the user device 108); biometric data (e.g., heart rate, blood pressure, oxygen saturation, fluctuations in biometric readings, or the like); and/or other information (e.g., facial expressions, time information, duration information, keyword detection in spoken words, or the like). These and other types of information can be collected by the user device 108 (e.g., via execution of the affinity application 112) via the sensors 110 and/or the off-board devices 114. The collected data 118 can be provided to the server computer 102 by the user device 108 and used as illustrated and described herein by the affinity service 106. It should be understood that this example is illustrative and therefore should not be construed as being limiting in any way.

According to various embodiments, the affinity service 106 can be configured to obtain the collected data 118 (or recognize receipt of the collected data 118). The affinity service 106 can be configured to analyze the collected data 118 to determine one or more affinities 120 associated with the user device 108 (or user or other entity associated with the user device 108). As used herein, an "affinity" refers to a relationship between an event or condition (as these terms are defined herein) associated with the user device 108 and a mood (as defined herein). Thus, an affinity 120 can define a mood (calm, agitated, upset, angry, or the like) for various types of events or conditions such as presence of a particular person in the environment 116 (e.g., a proximity of the user device 108), music that can be heard in the environment 116, transactions being completed or performed at the user device 108, a location associated with the environment 116, places of business at or near the environment 116, calendar events and/or calendar event descriptions, weather conditions, types of food or drink consumed by a user or other entity, activities or types of activities, traffic conditions, activities, combinations thereof, or the like.

It can be appreciated that a "mood" can be subjective. As such, the concepts and technologies described herein can be used to define a "mood" in objective terms. In particular, a "mood" as defined herein refers to an objectively detected or projected mood that is determined based upon collected data 118 and/or mood information that can be stored as part of one or more affinities 120 and/or elsewhere. The mood information can include definitions of particular moods for one or more users or other entities, and these moods can be defined for each user or other entity, in some embodiments. The mood therefore can be defined based upon biometric information (e.g., heart rate, oxygen saturation, blood pressure, fluctuations in biometric readings—which can indicate stress levels in some embodiments, combinations thereof, or the like); facial expressions associated with the user or other entity; keyword analysis (e.g., spoken words at or near the user device 108 can be monitored since certain words or phrases may indicate a mood associated with a user or other entity); combinations thereof; or the like.

Moods for a particular user can be defined based on various criteria, conditions, and the like, any or all of which may be defined by users or other entities. Some example user interfaces for defining moods are illustrated and described herein, particularly with reference to FIGS. 5G-5H. Regardless of how the moods are defined, the affinity service 106 can be configured to store the affinities 120. The affinities 120 can associate the defined moods with one or more events and/or conditions detected when the events occurred. Thus, the affinities 120 can correspond to associations between moods and one or more conditions associated with one or more events. The conditions can include, but are not limited to, locations (geographic locations, businesses or contacts at or near those locations, home or office locations, etc.); dates; times of day; weather conditions; proximity of people or objects; food or drink being consumed, seen, or smelled; local landmarks or venues; types of meetings; people associated with certain calendar events; social relationships with other people; time durations at locations or involved in transactions; combinations thereof, or the like. Thus, the affinities 120 can store past information associating conditions with mood. The affinities 120 can therefore be used by the affinity service 106 to identify or project moods when conditions are detected. Because the affinities 120 can be used for additional and/or alternative purposes, it should be understood that these examples are illustrative and therefore should not be construed as being limiting in any way.

According to various embodiments of the concepts and technologies described herein, the affinities 120 can be stored in a data storage device such as a data store 122. The functionality of the data store 122 can be provided by one or more databases, server computers, desktop computers, mobile telephones, laptop computers, other computing systems, and the like. In the illustrated embodiments, the functionality of the data store 122 can be provided by a database that can be stored by the server computer 102 and/or hosted by another data storage device that is remote from the server computer 102. It should be understood that this example is illustrative and therefore should not be construed as being limiting in any way.

The affinity service 106 can be configured to receive a request for affinity data ("affinity data request") 124. The affinity data request 124 can be generated by the user device 108 and/or other devices. In some other embodiments, the affinity service 106 can effectively generate the affinity data request 124 upon detecting an event associated with the user or other entity. Thus, the affinity data request 124 can be generated by the user device 108, the affinity service 106, and/or other entities. In some embodiments, the affinity service 106 can periodically obtain the collected data 118 from the user device 108. The affinity service 106 can detect, based upon an analysis of the collected data 118, an event associated with the user device 108. This detection can correspond, in various embodiments, to the affinity data request 124. Regardless of how the affinity data request 124 is obtained, the affinity service 106 can be configured to determine an event associated with the user device 108 in response to the affinity data request 124. It should be understood that this example is illustrative and therefore should not be construed as being limiting in any way.

The affinity service 106 can query the affinities 120 and identify moods and/or conditions that are associated with the event detected in association with the user device 108. The affinity service 106 can generate affinity data 126 based upon the identified affinities 120. Thus, the affinity service 106 can generate affinity data 126 that can indicate a defined mood associated with various events and/or conditions. The affinity service 106 can provide the affinity data 126 to the user device 108 and/or to one or more other systems and devices 128.

According to various embodiments, the affinity data 126 can be provided as an alert to the user device 108. The alert can indicate affinity information such as moods or the like associated with a detected condition or event. Thus, the alert can inform a user that a particular mood is projected based on an event or condition. The alert also can provide information related to an event or condition such as, for example, that a particular person has certain likes or dislikes, etc. These and other aspects of providing alerts using the affinity service 106 will be illustrated and described in more detail below, particularly with reference to FIGS. 2-5H. The affinity data 126 also can correspond to a social networking status update ("status update"), which can be generated based upon detected moods and/or conditions as illustrated and described in more detail herein. Thus, the other systems and devices 128 can include social networking services, or the like. It should be understood that this example is illustrative and therefore should not be construed as being limiting in any way.

In practice, the user device 108 and/or the affinity application 112 executed by the user device 108 can detect an event. The event can be detected based on various data sources (e.g., calendar events, application data, web activity, or the like) and/or activity detected at the user device 108. When an event is detected by the user device 108, the user device 108 can collect sensor readings and/or other types of data from one or more of the sensors 110 and/or one or more available off-board devices 114. The user device 108 can provide the collected data 118 to the affinity service 106 for analysis. It should be understood that the functionality of the affinity service 106 illustrated and described herein can also be provided by the affinity application 112. Thus, the affinity service 106 can operate as a module executed by the user device 108 in some embodiments, thereby allowing some embodiments to function without the illustrated the server computer 102. It should be understood that this example is illustrative and therefore should not be construed as being limiting in any way.

The affinity service 106 can analyze the collected data 118 and determine, based upon the analysis, one or more conditions at or near the user device 108 (e.g., in the environment 116) and a mood associated with a user or other entity. The affinity service 106 can generate the affinities 120. The affinities 120 can include data associations between the mood and the one or more conditions. The affinities 120 can be stored in a searchable manner so that the affinities 120 can be searched by any associated condition. The mood can be determined based upon an analysis of the biometric data and/or other information (e.g., facial expressions, detected laughter, detected crying, detected stress levels, keyword detection, combinations thereof, or the like), as explained above. In some embodiments, the data store 122 also can store mood data 130, which can define one or more moods by defining ranges for biometric data and/or other data points that can be used to determine mood. It can be appreciated that the mood data 130 can include, but is not limited to, the information mentioned herein with respect to "mood information." An example user interface for creating the mood data 130 will be illustrated and described in more detail herein, particularly with reference to FIGS. 5G-5H.

An event can be detected at or in association with the user device 108. The event can be detected in a variety of ways as explained above in detail. Regardless of how the events are detected, the user device 108 can obtain another iteration of the collected data 118 and provide the collected data 118 to the affinity service 106. The affinity service 106 can again analyze the collected data 118 to determine conditions associated with the user device 108. One or more of the conditions can be used to search the affinities 120. Affinities 120 that share conditions with the detected conditions can be identified and affinity data 126 that projects a mood can be generated and used for various purposes. In some other embodiments, a request for affinity data 126 can be received by the affinity service 106 and the affinity data 126 can be identified based on expected conditions. Thus, a projected mood and/or other types of affinity data 126 can be identified and used in accordance with various embodiments of the concepts and technologies described herein.

FIG. 1 illustrates one server computer 102, one network 104, one user device 108, and one data store 122. It should be understood, however, that various implementations of the operating environment 100 can include zero, one, or more than one server computer 102; zero, one, or more than one network 104; zero, one, or more than one user device 108; and/or zero, one, or more than one data store 122. As such, the illustrated embodiment should be understood as being illustrative, and should not be construed as being limiting in any way.

Figure 2:
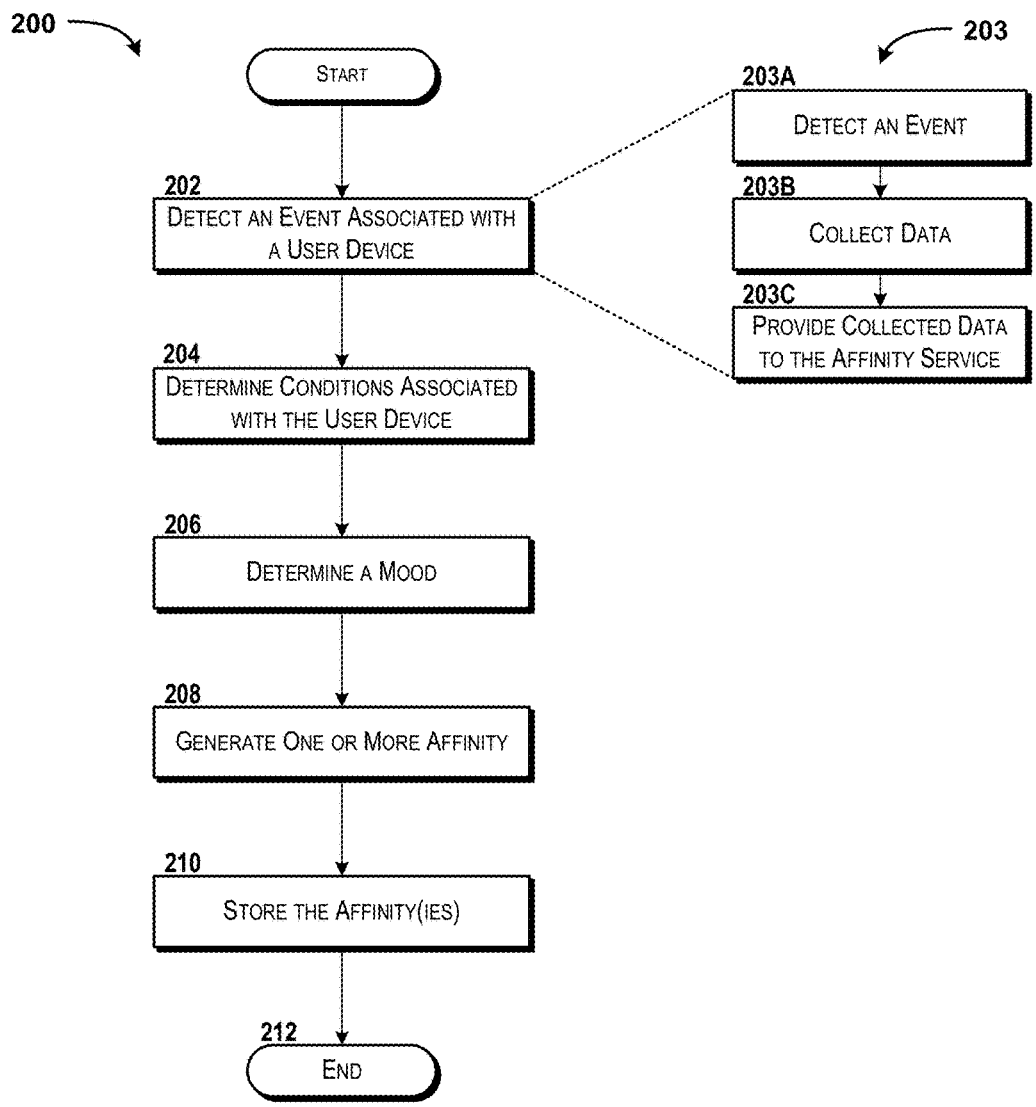
FIG. 2 is a flow diagram showing aspects of a method for creating affinities, according to an illustrative embodiment of the concepts and technologies described herein.

Turning now to FIG. 2, aspects of a method 200 for creating affinities 120 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 or the user device 108 to perform one or more operations and/or causing the processor to direct other components of the computing system or device to perform one or more of the operations.

For purposes of illustrating and describing the concepts of the present disclosure, the methods disclosed herein are described as being performed by the server computer 102 and/or the user device 108 via execution of one or more software modules such as, for example, the affinity service 106 and/or the affinity application 112. It should be understood that additional and/or alternative devices and/or network nodes can provide the functionality described herein via execution of one or more modules, applications, and/or other software including, but not limited to, the affinity service 106 and/or the affinity application 112. Thus, the illustrated embodiments are illustrative, and should not be viewed as being limiting in any way.

The method 200 begins at operation 202. At operation 202, the server computer 102 can detect an event associated with a device such as the user device 108. As explained above in detail, the server computer 102 can detect an event as shown in operation 202 in various manners. In some embodiments, for example, the server computer 102 can obtain the collected data 118 from a user device 108 and determine, based upon analyzing the collected data 118, that an event has occurred. Thus, operation 202 can include, in some embodiments, the server computer 102 obtaining the collected data 118 and analyzing the collected data 118 as illustrated and described above with reference to FIG. 1.

In some other embodiments, the user device 108 can determine that an event has occurred and provide the collected data 118 to the server computer 102. The user device 108 can determine that the event has occurred based upon detecting, and/or detecting a change in, a location, a weather condition, an audio condition (e.g., music playing, an ambient sound level, etc.), a light condition, a calendar event, a meeting, an activity, a travel condition, a transaction, combinations thereof, or the like. In some embodiments, the server computer 102 can determine, based upon receiving the collected data 118, that an event has occurred at the user device 108.

In some embodiments, the user device 108 can detect the event and provide the collected data via execution (by the affinity application 112) of a routine 203. The routine 203 can include the operations illustrated in FIG. 2 and/or additional and/or alternative operations. As such, it should be understood that the routine 203 is illustrative of the concepts and technologies described herein and that the routine 203 is not limited to the illustrated embodiment.

In the illustrated embodiment, the user device 108 can detect an event, as shown at operation 203A. As noted above, the user device 108 can detect the event by detecting calendar events, locations, local users, audio levels, light levels, application usage, transactions, weather conditions, other conditions, combinations thereof, or the like. In response to detecting the event, the user device 108 can collect data via the sensors 110 and/or the off-board devices 114, as shown at operation 203B. The user device 108 can package the data collected in operation 203B as the collected data 118 and provide the collected data 118 to the affinity service 106 as shown at operation 203C. Because the collected data 118 can be collected and/or provided to the server computer 102 in additional and/or alternative ways, it should be understood that the illustrated routine 203 is illustrative and should not be construed as being limiting in any way.

In some embodiments of the method 200, the routine 203 illustrated and described herein may not be performed and/or may be omitted. As such, operation 202 can correspond to the server computer 102 analyzing the collected data 118, which can be provided at various times, and detecting an event associated with the user device 108. It should be understood that this example is illustrative and therefore should not be construed as being limiting in any way.

From operation 202, the method 200 can proceed to operation 204. At operation 204, the server computer 102 can determine conditions associated with the user device 108. In operation 204, the server computer 102 can analyze the collected data 118 and determine, based upon the collected data 118, one or more conditions associated with the user device 108. Thus, operation 204 can include the server computer 102 analyzing the collected data 118 and determining one or more conditions based on data points in the collected data 118. Thus, for example, the server computer 102 can determine a location defined by the collected data 118, a temperature defined by the collected data 118, a user or object at or near the user device 108 as defined by the collected data 118, combinations thereof, other conditions, or the like. It can be appreciated with reference to FIG. 1 and the description of the collected data 118 in FIG. 1 that the conditions can include any sensor readings, data, or information illustrated and described with reference to the collected data 118. In operation 204, the server computer 102 can determine these data points and determine conditions based on these data points. As such, the above-mentioned examples of the conditions should be understood as being illustrative and should not be construed as being limiting in any way.

From operation 204, the method 200 can proceed to operation 206. At operation 206, the server computer 102 can determine a mood. According to various embodiments of the concepts and technologies described herein, the server computer 102 can determine the mood at least partially based on the conditions determined in operation 204, though this is not necessarily the case. The server computer 102 also can determine the mood by identifying biometric data and/or other information (e.g., facial expressions, keyword analysis, stress levels, or the like) included in the collected data 118 and comparing this information to the mood data 130 illustrated and described herein. Thus, operation 206 can be performed, in some embodiments in conjunction with operation 204, and as such, the server computer 102 may analyze the collected data 118 to identify conditions and mood in a single operation, in some embodiments. It should be understood that this example is illustrative and therefore should not be construed as being limiting in any way.

From operation 206, the method 200 can proceed to operation 208. At operation 208, the server computer 102 can generate one or more affinity 120. According to various embodiments of the concepts and technologies described herein, the affinity 120 generated in operation 208 can include one or more affinity between a condition detected in operation 204 and one or more mood determined in operation 206. The one or more affinity 120 also can include and/or reflect other conditions associated with the event detected in operation 202. Thus, it should be appreciated that an affinity 120 generated in operation 208 may include at least a relationship between a mood and a condition. The affinity 120 generated in operation 208 also can include a location, proximity to people or things, transactions, event descriptions, other types of information illustrated and described herein, and the like. According to various embodiments, the affinities 120 can be generated as records or other data structures that can associate one or more conditions with one or more moods. It should be understood that this example is illustrative and therefore should not be construed as being limiting in any way.

From operation 208, the method 200 can proceed to operation 210. At operation 210, the server computer 102 can store the one or more affinities 120. Thus, in operation 210, the server computer 102 can store the affinities 120 generated in operation 208. In some embodiments, the server computer 102 can store the affinities 120 at a data storage device such as, for example, the data store 122, though this is not necessarily the case. According to various embodiments of the concepts and technologies described herein, the affinities 120 can be catalogued and stored in a searchable format. Thus, the affinity service 106 can be configured to query any aspect of the affinities 120 such as, for example, mood or condition. These and other aspects of matching affinities 120 to conditions will be more clearly understood with reference to FIGS. 3-5H.

From operation 210, the method 200 can proceed to operation 212. The method 200 can end at operation 212.

Figure 3:
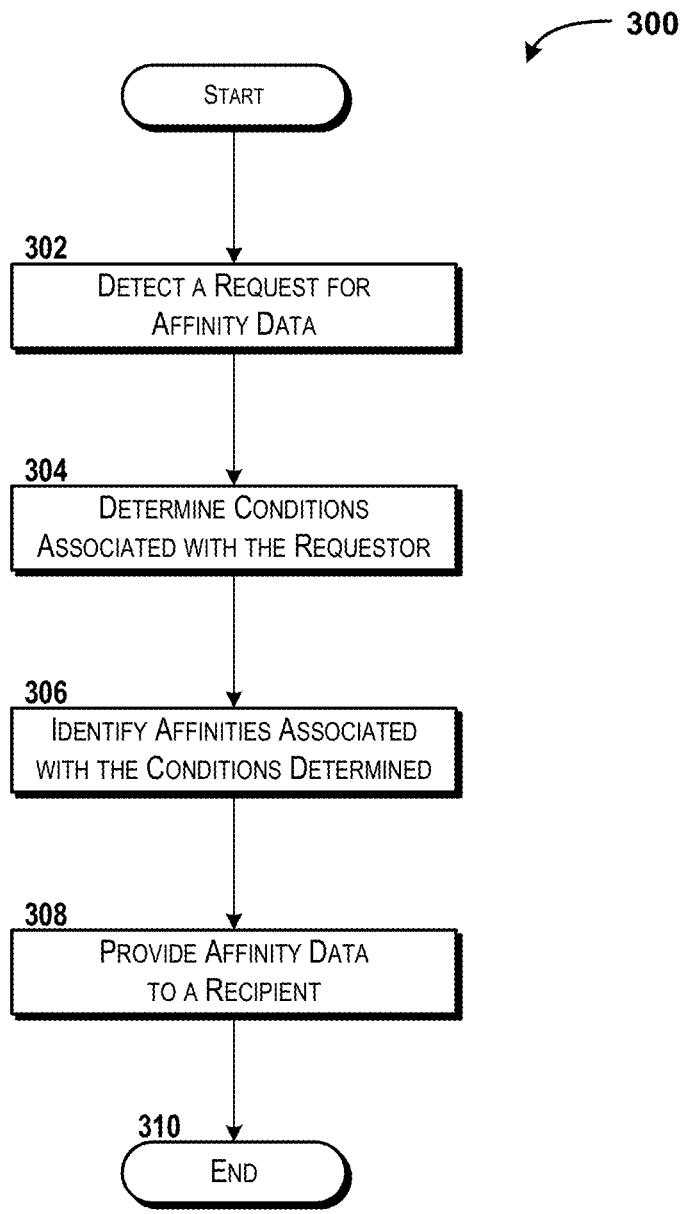
FIG. 3 is a flow diagram showing aspects of a method for providing affinity data to a requestor, according to an illustrative embodiment of the concepts and technologies described herein.

Turning now to FIG. 3, aspects of a method 300 for providing affinity data 126 to a requestor will be described in detail, according to an illustrative embodiment. The method 300 begins at operation 302. At operation 302, the server computer 102 can detect a request for affinity data 126. According to various embodiments of the concepts and technologies described herein, the request for affinity data 126 can correspond to the affinity data request 124 illustrated and described herein with reference to FIG. 1. Thus, it can be appreciated that the request received in operation 302 can be received from the user device 108, in some embodiments, while in some other embodiments, the affinity data request 124 can be received from other entities. It should be understood that these examples are illustrative and therefore should not be construed as being limiting in any way.

In various embodiments of the concepts and technologies described herein, the request received in operation 302 can include at least one condition. Thus, the request received in operation 302 can be implicitly determined to have been received by the server computer 102 by receiving the collected data 118. In other words, in some embodiments of the concepts and technologies described herein, the server computer 102 can determine, based upon receiving the collected data 118, that affinity data 126 is being requested and/or should be provided. It should be understood that these examples are illustrative and therefore should not be construed as being limiting in any way. Regardless of how the request in operation 302 is received (explicitly or implicitly), operation 302 can correspond to the server computer 102 determining that affinity data 126 should be provided to a recipient.

From operation 302, the method 300 can proceed to operation 304. At operation 304, the server computer 102 can determine conditions associated with the requestor. In some embodiments, the server computer 102 can, in response to receiving the request in operation 302, obtain the collected data 118 from the user device 108. In some other embodiments, the server computer 102 may determine that the affinity data 126 should be provided in response to receiving the collected data 118. Regardless of whether the collected data 118 is obtained before or after operation 302, the server computer 102 can determine, in operation 304, one or more condition associated with the user device 108.

As explained above with reference to FIG. 2, the server computer 102 can determine, in operation 304, one or more condition including, but not limited to, a weather condition, an audio level condition, a light level condition, a transaction occurring, a local object or person, other conditions, combinations thereof, or the like. Thus, operation 304 can correspond to the server computer 102 analyzing the collected data 118 and identifying one or more condition associated with the user device 108. It should be understood that this example is illustrative and therefore should not be construed as being limiting in any way.

From operation 304, the method 300 can proceed to operation 306. At operation 306, the server computer 102 can identify one or more affinities 120 associated with the conditions determined in operation 304. Thus, in operation 306, the server computer 102 can query the affinities 120 using one or more of the determined conditions to identify affinities 120 that are related to the one or more conditions. In some embodiments, the server computer 102 determines, in operation 304, each condition associated with the collected data 118, and queries, in operation 306, the affinities 120 using each of the conditions determined. Thus, it can be appreciated that the server computer 102 can determine, in some embodiments of operation 306, one affinity 120 per condition (if stored). It should be understood that this example is illustrative and therefore should not be construed as being limiting in any way.

From operation 306, the method 300 can proceed to operation 308. At operation 308, the server computer 102 can provide affinity data 126 to a recipient. Thus, operation 308 can include the server computer 102 generating the affinity data 126 based upon the affinities identified in operation 306 and providing the affinity data 126 to a recipient. It should be understood that the recipient need not be the same entity that requested the affinity data 126, in some embodiments, while in other embodiments the requestor and the recipient may be the same entity.

In particular, in one contemplated embodiment, the user device 108 can request the affinity data 126 in operation 302. The affinity data 126 can include a social networking update. The social networking update can be provided to the user device 108 or to a social networking service or other recipient. Thus, it can be appreciated using this simple example that the recipient and the requestor need not be the same entity.

In some other embodiments, the requestor and the recipient can be the same entity. Thus, for example, the user device 108 may request the affinity data 126 (explicitly or implicitly), and the affinity data 126 can be provided to the user device 108 in operation 308. According to various embodiments, the affinity data 126 can be provided as an alert, as part of a display, or in other formats. Various example embodiments for providing the affinity data 126 to various entities will be illustrated and described in more detail herein with reference to FIGS. 5A-5F.

In some embodiments, the affinity data 126 can be provided to the user device 108 as part of graphics data that, when rendered by the user device 108, causes the user device 108 to display one or more affinities 120 and/or components thereof such as moods, conditions, or the like. Because other recipients and requestors are contemplated, and because the affinity data 126 can be provided in a variety of formats, it should be understood that these examples are illustrative and therefore should not be construed as being limiting in any way.

From operation 308, the method 300 can proceed to operation 310. The method 300 can end at operation 310.

Figure 4:
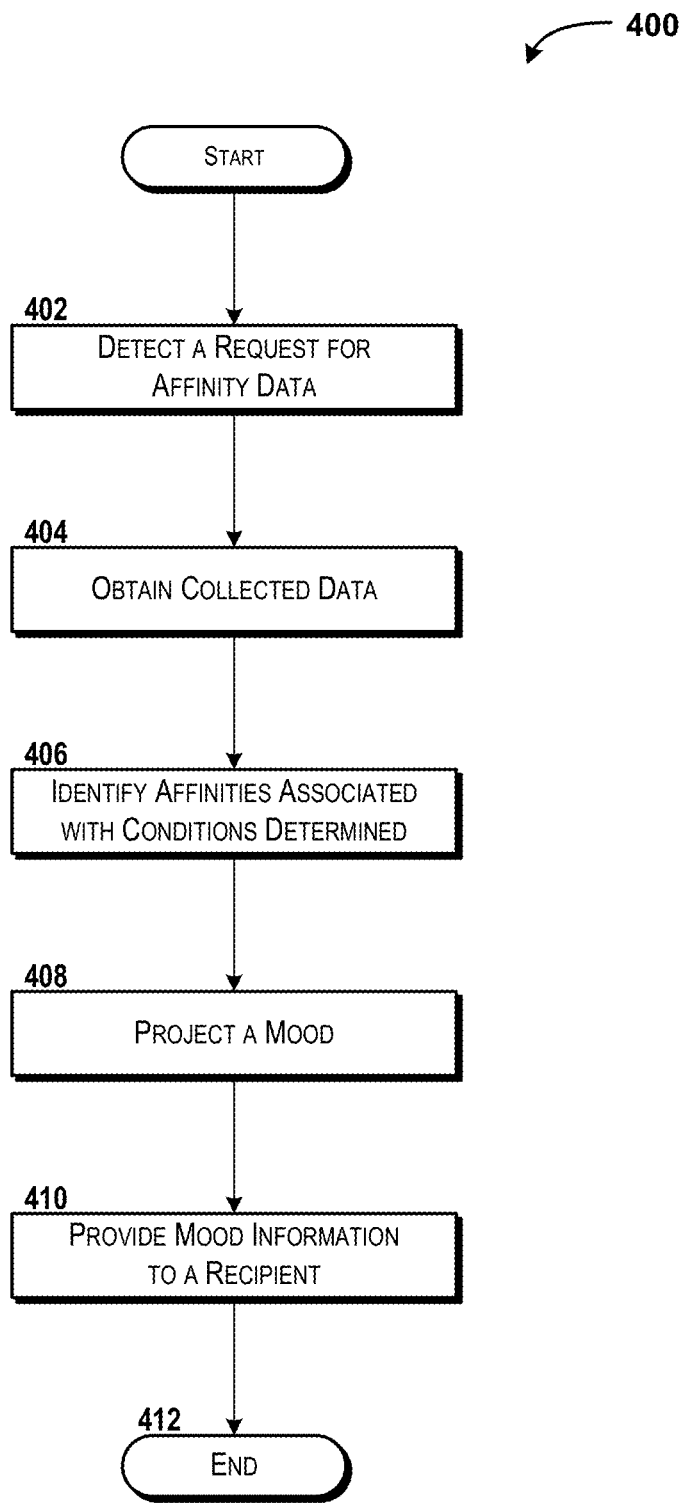
FIG. 4 is a flow diagram showing aspects of a method for projecting a mood using affinity data, according to an illustrative embodiment of the concepts and technologies described herein.

Turning now to FIG. 4, aspects of a method 400 for projecting a mood using affinity data 126 will be described in detail, according to an illustrative embodiment. The method 400 begins at operation 402. At operation 402, the server computer 102 can detect a request for affinity data 126. According to various embodiments of the concepts and technologies described herein, operation 402 can be, but is not necessarily, similar to operation 302 illustrated and described herein. Thus, it should be understood that the request detected in operation 402 can be explicitly made by a requestor and/or implicitly determined to have been made by analyzing collected data 118. It should be understood that these examples are illustrative and therefore should not be construed as being limiting in any way.

From operation 402, the method 400 can proceed to operation 404. At operation 404, the server computer 102 can obtain collected data 118 associated with the requestor. As explained above with reference to operation 304 of the method 300 illustrated and described in FIG. 3, the collected data 118 can be provided by the user device 108 before operation 402 and/or as part of operation 404. Thus, the server computer 102 can request the collected data 118 from the user device 108 and receive the collected data 118 from the user device 108 in operation 404, in some embodiments, while in some other embodiments the user device 108 may provide the collected data 118 to the server computer 102 before operation 402 or 404. At any rate, the server computer 102 can obtain the collected data 118.

From operation 404, the method 400 can proceed to operation 406. At operation 406, the server computer 102 can identify affinities 120 that are related to the collected data 118. Thus, in operation 406, the server computer 102 can analyze the collected data 118 to identify one or more conditions associated with the user device 108. Based upon the one or more conditions, the server computer 102 can query the affinities 120 to identify moods and/or conditions (stored as part of the affinities 120) that are relevant to, correspond to, and/or are associated with the determined conditions. In some embodiments of the method 400, the server computer 102 can identify each condition represented by the collected data 118 and query the affinities 120 based on each condition. It should be understood that this example is illustrative and therefore should not be construed as being limiting in any way.

From operation 406, the method 400 can proceed to operation 408. At operation 408, the server computer 102 can project a mood based upon the affinities 120 identified in operation 406. Thus, in operation 408, the server computer 102 can analyze one or more (or each) of the affinities 120 identified in operation 406 and identify a mood represented by each affinity 120. Thus, in some embodiments the server computer 102 can be configured to determine multiple moods and project a most likely mood in operation 408 based on further analysis of the multiple moods.

In some embodiments, for example, if two different moods can be identified. The server computer 102 can be configured to determine a most likely mood of the two different moods based on various factors (e.g., certain conditions may be more likely to affect a mood than other conditions and as such, a mood associated with the condition that is more likely to affect mood may be determined to be most likely). In one contemplated example, the server computer 102 can determine a mood (of multiple moods that are possible) that has the most associated conditions. For example, if the server computer 102 determines that five determined conditions indicate mood number one and that one determined condition indicates mood number two, the server computer 102 may determine that mood number one is most likely. It should be understood that this example is illustrative and therefore should not be construed as being limiting in any way.

In some other embodiments, the server computer 102 can identify a most likely mood based upon a knowledge of what factors affect mood the most, as noted above, and as such any number of moods and/or conditions can be analyzed to project a most likely mood based upon conditions. Regardless of how the mood is determined by the identified affinities 120, the server computer 102 can project the mood based on the affinities 120 and the conditions determined to exist at the user device 108. It should be understood that this example is illustrative and therefore should not be construed as being limiting in any way.

From operation 408, the method 400 can proceed to operation 410. At operation 410, the server computer 102 can provide the mood information to a recipient. As noted above, the requestor and the recipient can be different entities and/or the same entity. The mood information can be provided to a user device 108, for example, within an alert screen or other user interface. Alternatively, the mood information can be provided to other entities that are unrelated to the requestor. Regardless of to whom the mood information is provided, various embodiments of user interfaces for presenting affinity data 126 that captures the mood information will be illustrated and described herein in more detail with reference to FIGS. 5A-5H.

From operation 410, the method 400 can proceed to operation 412. The method 400 can end at operation 412.

Figure 5A:
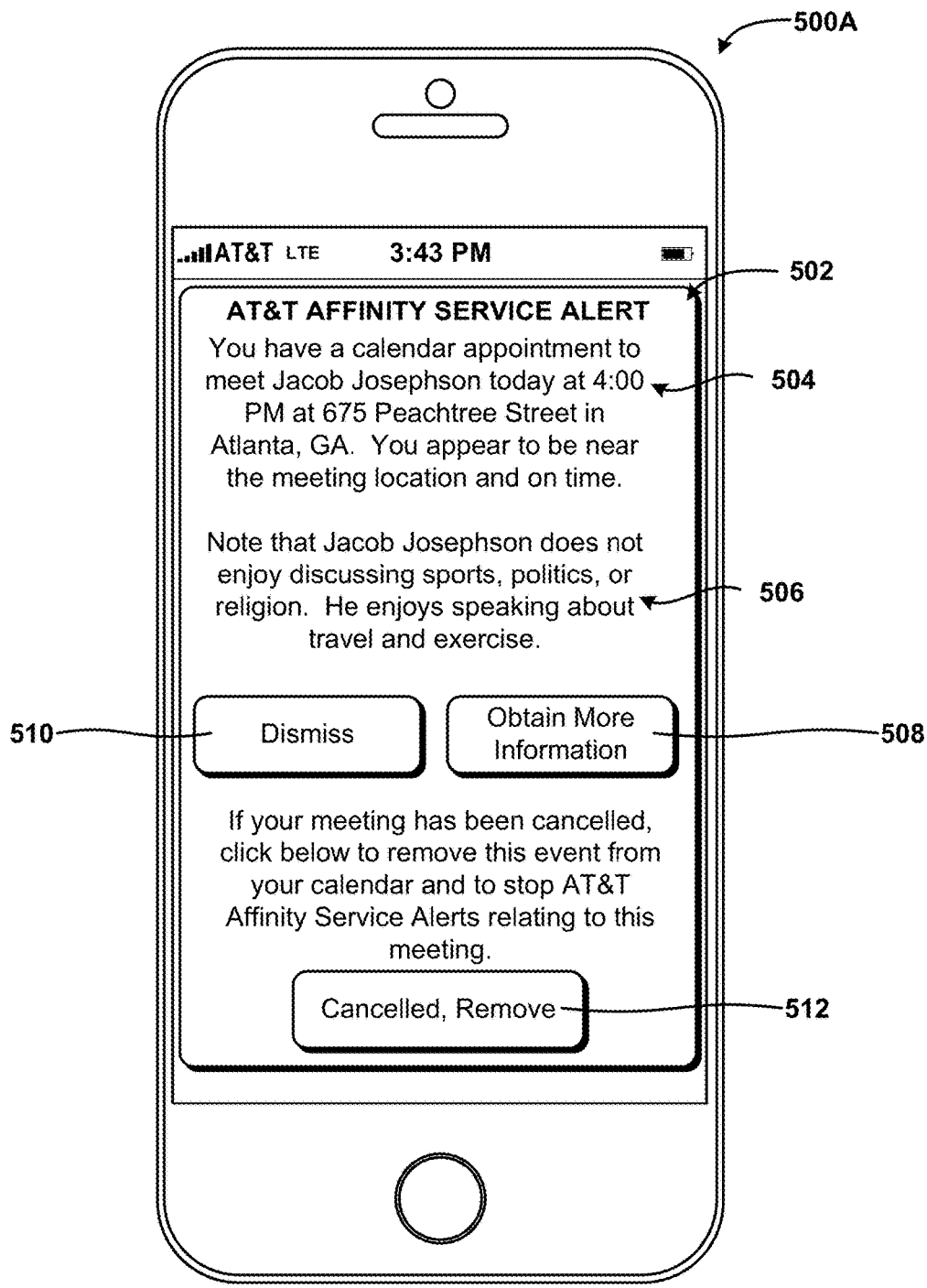
FIGS. 5A-5H are user interface diagrams showing various screen displays for detecting, providing, and using mood-condition affinities, according to some illustrative embodiments of the concepts and technologies described herein.

FIGS. 5A-5H are user interface ("UI") diagrams showing aspects of UIs for using and/or interacting with an affinity service 106 and/or the affinity application 112, according to some illustrative embodiments. FIG. 5A shows an illustrative screen display 500A. According to some embodiments of the concepts and technologies described herein, the screen display 500A can be generated by a device such as the user device 108 via interactions with the affinity service 106 and/or the affinity application 112. In particular, according to various embodiments, the user device 108 can generate the screen display 500A and/or other screen displays in conjunction with and/or based upon interactions with the affinity application 112 described herein, which can be configured to render the screen display 500A using data generated at the user device 108 and/or using data provided by the affinity service 106. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, when affinity data 126 is received by the user device 108 (e.g., prompted by detected events at the user device 108). Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include an affinity service alert window 502. The affinity service alert window 502 can be configured to provide the affinity data 126 illustrated and described herein to a user or other entity. The affinity service alert window 502 can include various types of data and/or information that can be included in the affinity data 126. Thus, as illustrated and described herein, the affinity service alert window 502 can include event-based information ("event information") 504. The event information 504 can provide context for the alert being provided by way of the affinity service alert window 502. In the illustrated embodiment, the event information 504 includes an indication that a calendar event (including location, time, and participants) is about to occur. Thus, the event information 504 can provide a context for the affinity data 126 being provided in relation to the corresponding event. It should be understood that this example is illustrative and therefore should not be construed as being limiting in any way.

As shown in FIG. 5A, the affinity service alert window 502 also includes affinity information 506 that relates to the event. As shown in the example embodiment illustrated in FIG. 5A, the affinity information 506 indicates a preference associated with Jacob Josephson, a participant in a meeting (event). It should be understood that the illustrated affinity information 506 is illustrative, and that the affinity data 126 that relates to the participant can be any type of information illustrated and described herein. It also can be appreciated that the participant in the illustrated embodiment may also be a user of the affinity service 106 who has opted to share his affinities 120 and/or other information such that the affinity data 126 can reflect his or her preferences, likes, etc., though this is not necessarily the case. It should be understood that this example is illustrative and therefore should not be construed as being limiting in any way.

The affinity service alert window 502 also can include a UI control 508 to obtain more information. Selection of the UI control 508 can cause the user device 108 to present additional and/or alternative affinity information that relates to the event. Thus, selection of the UI control 508 can present additional and/or alternative likes or dislikes associated with the participant; mood and/or history information associated with a user or other entity associated with the user device 108 and the location, time, and/or participant; other information; combinations thereof; or the like. The affinity service alert window 502 also can include a UI control 510 to dismiss the affinity service alert window 502. Thus, for example, the user or other entity can select the UI control 510 to cause the user device 108 to close the affinity service alert window 502 when the desired information has been obtained via the affinity service alert window 502, when the user or other entity wishes to close the affinity service alert window 502 for other reasons, and/or at other times at which the UI control 510 is selected.

The affinity service alert window 502 also can include a UI control 512 to cancel the event and/or to cease obtaining information relevant to the event. The UI control 512 may be selected, for example, if the meeting has been cancelled; if the user or other entity does not desire any other affinity information relevant to the event; or the like. Selection of the UI control 512 can cause the user device 108 to remove the event from the calendar; to cease recognizing the event as an event for purposes of obtaining affinity data 126 (e.g., by the affinity application 112); or the like. It can be appreciated that selection of the UI control 512 also can cause the user device 108 to hide the affinity service alert window 502, though this is not necessarily the case. Because additional or alternative controls can be included in the affinity service alert window 502, it should be understood that the example embodiment shown in FIG. 5A is illustrative and therefore should not be construed as being limiting in any way.

Figure 5B:
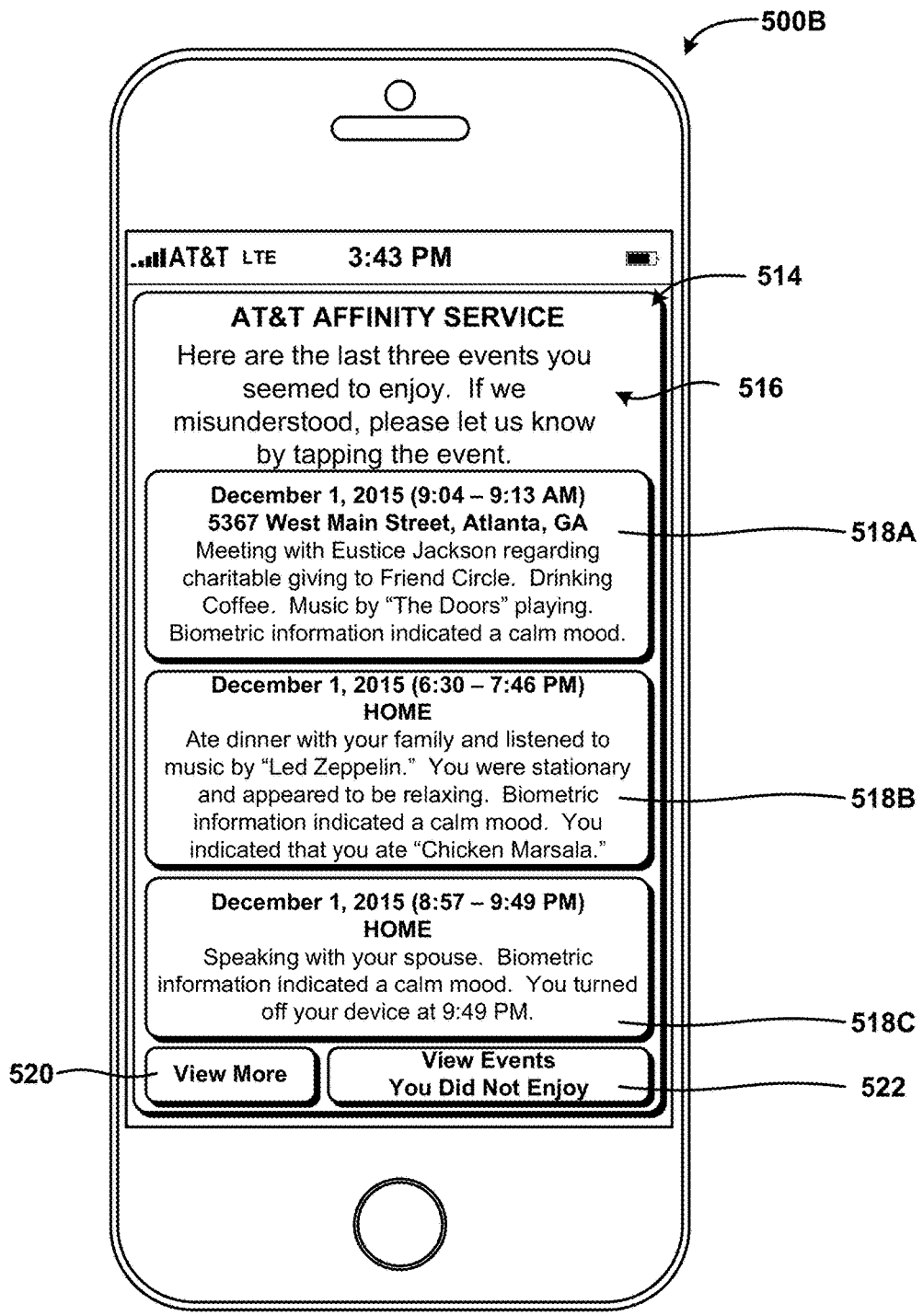

Referring now to FIG. 5B, a UI diagram showing additional aspects of some of the concepts and technologies disclosed herein for providing and/or using an affinity service 106 and/or the affinity application 112 is described in detail. In particular, FIG. 5B shows an illustrative screen display 500B. According to various embodiments, the user device 108 can generate the screen display 500B and/or other screen displays in conjunction with and/or based upon interactions with the affinity service 106 and/or the affinity application 112 described herein (e.g., via rendering data provided by the affinity service 106 and/or the affinity application 112, or the like). In the illustrated embodiment, the screen display 500B can be presented, for example, in response to detecting a request to view events that a user or other entity enjoyed. Because the screen display 500B can be presented at additional and/or alternative times, it should be understood that this example is illustrative and therefore should not be construed as being limiting in any way. Also, it should be appreciated that the UI diagram illustrated in FIG. 5B is illustrative of one contemplated example of the UIs that can be generated and/or displayed in accordance with the concepts and technologies disclosed herein, and therefore should not be construed as being limited in any way.

The screen display 500B can include an enjoyed event display window 514. It should be understood that the enjoyed event display window 514 shown in FIG. 5B is one contemplated embodiment of a display that can be used to display affinity data 126 such as events that were enjoyed by a user or other entity (e.g., a user of the user device 108). As such, the illustrated embodiment should not be construed as being limiting in any way.

As shown in FIG. 5B, the enjoyed event display window 514 can provide an indication 516 of the types of affinity data 126 being displayed. In this case, as noted above, the enjoyed event display window 514 displays information relating to enjoyed events, and as such, the indication 516 can provide an explanation to this effect, though this is not necessarily the case. The enjoyed event display window 514 also can include one or more enjoyed event information fields 518A-C (hereinafter collectively and/or generically referred to as "enjoyed event information fields 518"). The enjoyed event information fields 518 can provide various types of information relating to events that were determined by the affinity service 106 and/or the affinity application 112 as being enjoyable. As explained herein, the notion of what is "enjoyed" can generally be subjective, and as such, a user or other entity can define objective standards by which moods can be determined (or at least projected) in accordance with the concepts and technologies described herein.

As shown in FIG. 5B, the enjoyed event information fields 518 can display information describing the events that were enjoyed. For example, the event information field 518A defines an associated event as a meeting at a certain date, time, and location with a certain person (in the illustrated embodiment, a meeting at 5367 West Main Street in Atlanta, Ga. on Dec. 1, 2015 at 9:04 through 9:13 AM). The enjoyed event information fields 518 also can provide affinity data 126 associated with the event that corresponds to the enjoyed event information fields 518. The example enjoyed event information field 518A also shows various types of affinity data 126. In the example embodiment, the affinity data 126 includes collected data 118 that was collected during the event and therefore may have been determined to have an affinity with the mood detected during the associated event. In this case, a music playing in the background ("The Doors"); a drink being consumed ("coffee"); an activity (engaging in charitable works); and a person with whom the entity or other user was meeting ("Eustice Jackson") may have been determined to be related to the detected calm mood. It should be understood that this example is illustrative and therefore should not be construed as being limiting in any way.

As can be appreciated from the description of the concepts and technologies described herein, the enjoyed event information fields 518 can provide any information that was determined to be (or projected to be) related to the mood detected or projected at the time of the corresponding events. Thus, some of the enjoyed event information fields 518 indicate other people in a proximity of a user or other entity at the time of the detected event (e.g., "your family" in the enjoyed event information field 518B and "your spouse" in the enjoyed event information field 518C); foods or drinks being consumed during the meetings (e.g., "coffee" in the enjoyed event information field 518A and "chicken marsala" in the enjoyed event information field 518B); locations (e.g., "5367 West Main Street, Atlanta, Ga." in the enjoyed event information field 518A and "home" in the enjoyed event information fields 518B-C); and/or other information. Affinities 120 can be detected based on almost any detected conditions as illustrated and described herein including, but not limited to, geographic location, time, date, other people, music being played, temperature or other weather conditions, food or drink being consumed, transactions occurring, calendar events, other conditions, combinations thereof, or the like. Because various other conditions are illustrated and described herein and can be used to detect affinities 120, it should be understood that these examples are illustrative and therefore should not be construed as being limiting in any way.

The enjoyed event display window 514 also can include a UI control 520. The UI control 520 can be selected to view more events that were enjoyed by a user or other entity (or interpreted to have been enjoyed). Thus, selection of the UI control 520 can cause the user device 108 to present additional and/or alternative enjoyed event information fields 518. It should be understood that additional enjoyed event information fields 518 can also be accessed via scrolling a display (or panning with a finger or other input device), or the like. The enjoyed event display window 514 also can include a UI control 522. The UI control 522 can be selected to view events that were not enjoyed by the user or other entity (or interpreted to have not been enjoyed). Thus, selection of the UI controls 520, 522 can, but do not necessarily, cause the user device 108 to hide the enjoyed event display window 514. Because additional or alternative controls can be included in the screen display 500B, it should be understood that the example embodiment shown in FIG. 5B is illustrative and therefore should not be construed as being limiting in any way.

Figure 5C:
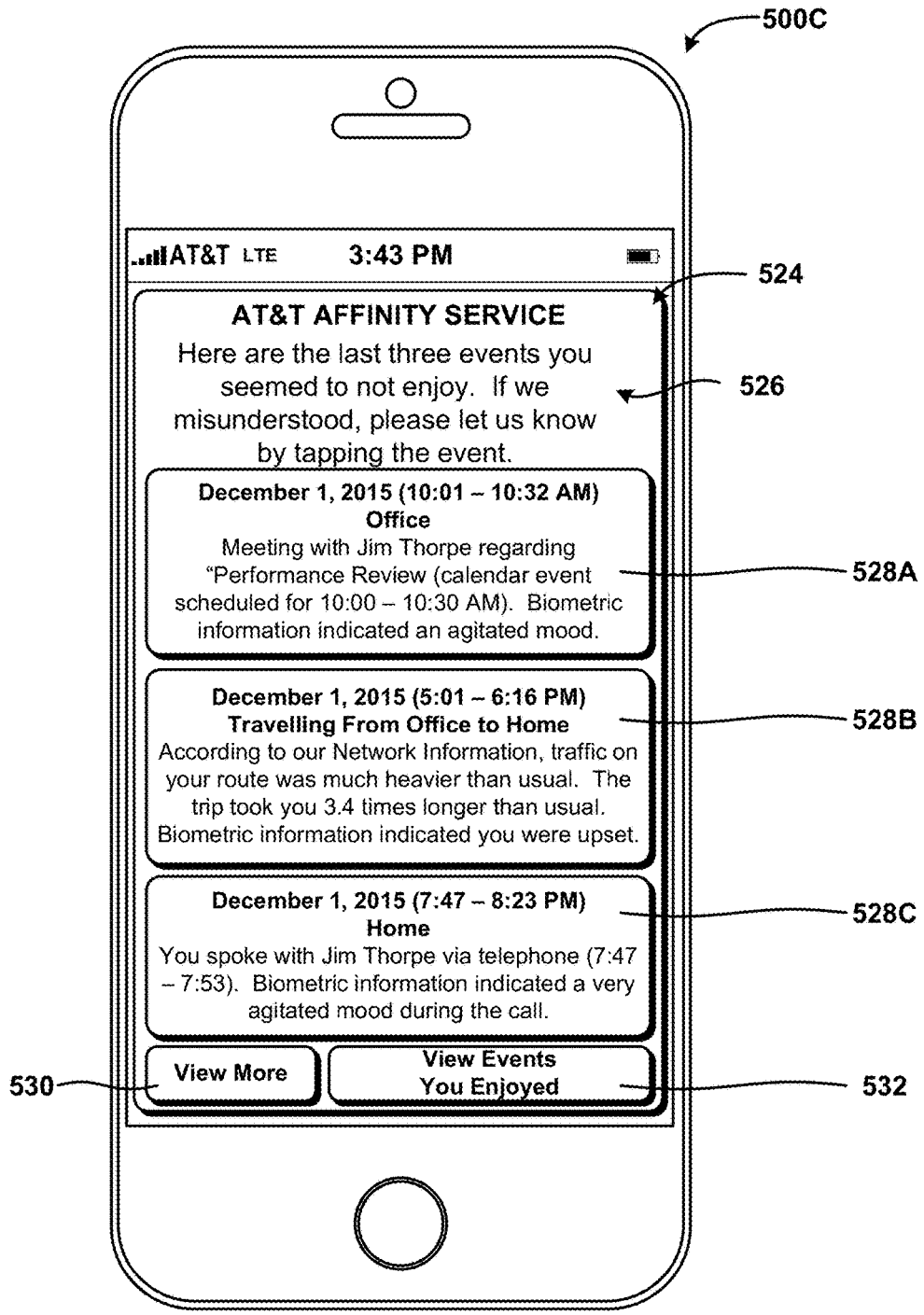

Referring now to FIG. 5C, a UI diagram showing additional aspects of some of the concepts and technologies disclosed herein for providing and/or using an affinity service 106 and/or the affinity application 112 is described in detail. In particular, FIG. 5C shows an illustrative screen display 500C. According to various embodiments, the user device 108 can generate the screen display 500C and/or other screen displays in conjunction with and/or based upon interactions with the affinity service 106 and/or the affinity application 112 described herein (e.g., via rendering data provided by the affinity service 106 and/or the affinity application 112, or the like). In the illustrated embodiment, the screen display 500C can be presented, for example, in response to detecting a request to view events that a user or other entity did not enjoy. For example, the screen display 500C can be presented in response to detecting an interaction with the UI control 532 illustrated and described above with reference to FIG. 5B, though this is not necessarily the case. Because the screen display 500C can be presented at additional and/or alternative times, it should be understood that these examples are illustrative and therefore should not be construed as being limiting in any way. Also, it should be appreciated that the UI diagram illustrated in FIG. 5C is illustrative of one contemplated example of the UIs that can be generated and/or displayed in accordance with the concepts and technologies disclosed herein, and therefore should not be construed as being limited in any way.

The screen display 500C can include an unenjoyable event display window 524. It should be understood that the unenjoyable event display window 524 shown in FIG. 5C is one contemplated embodiment of a display that can be used to display affinity data 126 such as events that were not enjoyed by a user or other entity (or events that were at least understood to have not been enjoyed by the user or other entity such as a user of the user device 108). As such, the illustrated embodiment should not be construed as being limiting in any way.

As shown in FIG. 5C, the unenjoyable event display window 524 can provide an indication 526 of the types of affinity data 126 being displayed. In this case, as noted above, the unenjoyable event display window 524 displays information relating to events that were interpreted (or determined) to have not been enjoyed by a user or other entity. As such, the indication 526 can provide an explanation that one or more events that were not enjoyed by the user or other entity are being displayed, though this is not required in all embodiments.

The unenjoyable event display window 524 can include one or more unenjoyable event information fields 528A-C (hereinafter collectively and/or generically referred to as "unenjoyable event information fields 528"). The unenjoyable event information fields 528 can provide various types of information relating to events that were determined by the affinity service 106 and/or the affinity application 112 as being unenjoyable to the user or other entity (e.g., a user associated with the user device 108). As noted above with respect to "enjoyed" events, notions of what is "unenjoyable" can also be subjective. Thus, as noted above, users or other entities can define objective standards by which moods can be determined (or projected) in accordance with the concepts and technologies described herein.

As shown in FIG. 5C, the unenjoyable event information fields 528 can display information describing the events that were perceived as not being enjoyed by the user or other entity. For example, the event information field 528A defines an associated event as a "Performance Review" at a certain date, time, location, and participant. In the illustrated embodiment, a meeting at "Office" on Dec. 1, 2015 at 10:01 AM through 10:32 AM with Jim Thorpe (who could be the user's or other entity's boss, for example). The unenjoyable event information fields 528 also can provide affinity data 126 associated with the event that corresponds to the unenjoyable event information fields 528.

The example unenjoyable event information field 528A also displays affinity data 126. In the example embodiment, the affinity data 126 includes collected data 118 that was collected during the event and therefore may have been determined to have an affinity with the mood detected during the associated event. In the illustrated embodiments, participants or other entities detected at events, traffic conditions, or other information may have been determined to be related to the detected agitated mood. It should be understood that these examples are illustrative and therefore should not be construed as being limiting in any way.

As can be appreciated from the description of the concepts and technologies described herein, the unenjoyable event information fields 528 can provide any information that was determined to be (or projected to be) related to the mood detected or projected at the time of the corresponding events. Thus, some of the unenjoyable event information fields 528 indicate other people in a proximity of a user or other entity at the time of the detected event (e.g., "Jim Thorpe" in the unenjoyable event information fields 528A and 528C); traffic conditions (e.g., "heavier than usual" traffic and 3.4 times longer commute in the unenjoyable event information field 528B); locations (e.g., "Office" in the unenjoyable event information field 528A and "home" in the unenjoyable event information field 528C); and/or other information. Affinities 120 can be detected based on almost any detected conditions as illustrated and described herein including, but not limited to, geographic location, time, date, other people, music being played, temperature or other weather conditions, food or drink being consumed, transactions occurring, calendar events, combinations thereof, traffic conditions, delays, other conditions, or the like. Because various other conditions are illustrated and described herein and can be used to detect affinities 120, it should be understood that these examples are illustrative and therefore should not be construed as being limiting in any way.

The unenjoyable event display window 524 also can include a UI control 530. The UI control 530 can be selected to view more events that were enjoyed by a user or other entity (or interpreted to have not been enjoyed). Thus, selection of the UI control 530 can cause the user device 108 to present additional and/or alternative unenjoyable event information fields 528. It should be understood that additional unenjoyable event information fields 528 can also be accessed via scrolling a display (or panning with a finger or other input device), or the like, as noted above with reference to FIG. 5B. The unenjoyable event display window 524 also can include a UI control 532. The UI control 532 can be selected to view events that were enjoyed by the user or other entity (or interpreted to have not been enjoyed). Thus, selection of one of the UI controls 530, 532 can, but does not necessarily, cause the user device 108 to hide the unenjoyable event display window 524. Also, selection of the UI control 532 can cause the user device 108 to present the screen display 500B illustrated and described above with reference to FIG. 5B, though this is not necessarily the case. Because additional or alternative controls can be included in the screen display 500C, it should be understood that the example embodiment shown in FIG. 5C is illustrative and therefore should not be construed as being limiting in any way.

Figure 5D:
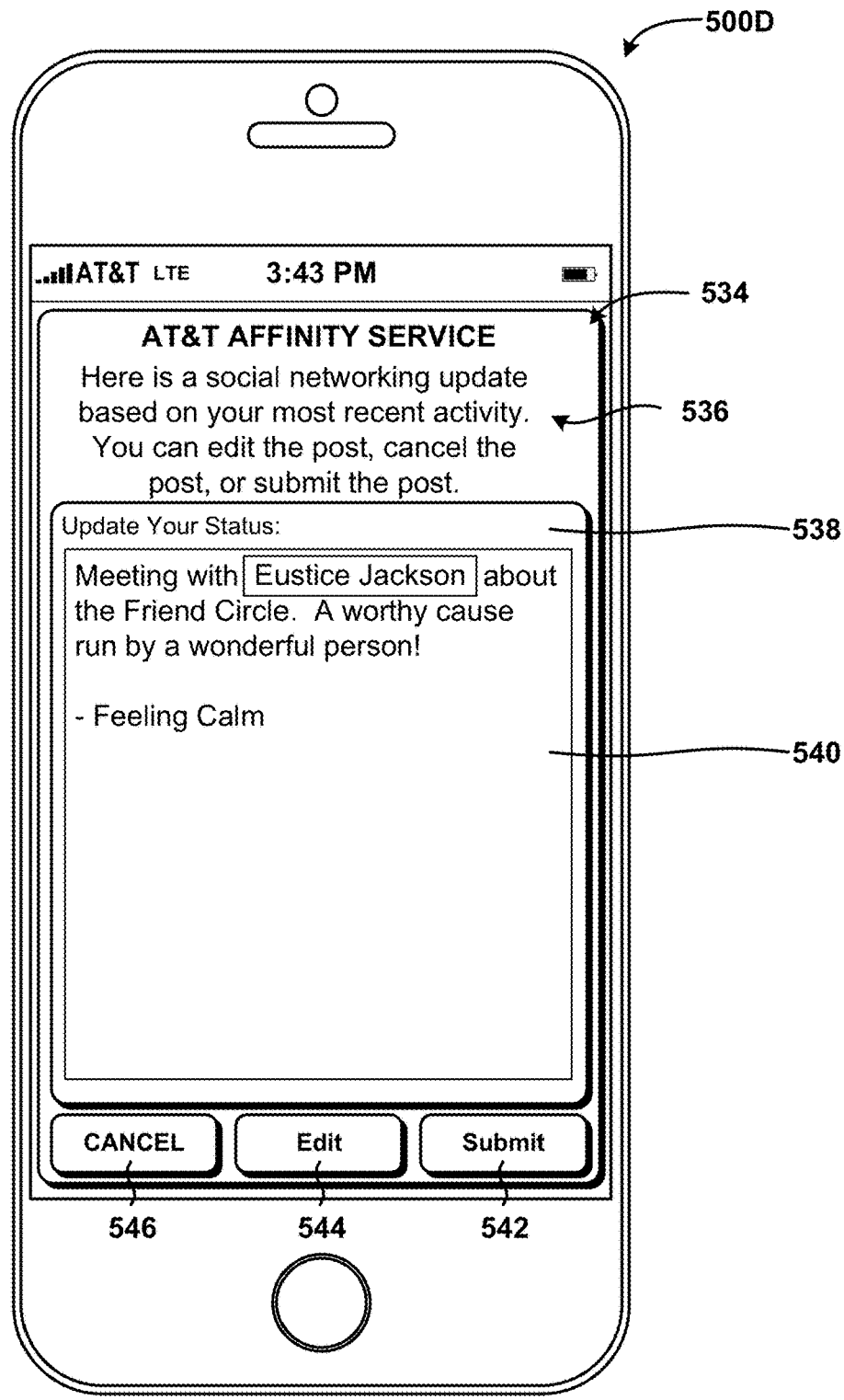

Referring now to FIG. 5D, a UI diagram showing additional aspects of some of the concepts and technologies disclosed herein for providing and/or using an affinity service 106 and/or the affinity application 112 is described in detail. In particular, FIG. 5D shows an illustrative screen display 500D. According to various embodiments, the user device 108 can generate the screen display 500D and/or other screen displays in conjunction with and/or based upon interactions with the affinity service 106 and/or the affinity application 112 described herein (e.g., via rendering data provided by the affinity service 106 and/or the affinity application 112, or the like). In the illustrated embodiment, the screen display 500D can be presented, for example, in response to detecting an event and determining, based upon a setting or explicit request, that a social networking update should be generated based upon the event (and/or affinity data 126 associated with the event). Because the screen display 500D can be presented at additional and/or alternative times, it should be appreciated that this example is illustrative and therefore should not be construed as being limiting in any way. Also, it should be understood that the UI diagram illustrated in FIG. 5D is illustrative of one contemplated example of the UIs that can be generated and/or displayed in accordance with the concepts and technologies disclosed herein, and therefore should not be construed as being limited in any way.

The screen display 500D can include a social networking status update window 534. It should be understood that the social networking status update window 534 shown in FIG. 5D is one contemplated embodiment of a display that can be used to generate a social networking update. As such, the illustrated embodiment should not be construed as being limiting in any way. As shown in FIG. 5D, the social networking status update window 534 can provide an indication 536 that the social networking update is being generated based upon a detected event and/or affinity data 126 associated with the event. The social networking status update window 534 also can include a status update window 538.

The status update window 538 can include a status text field 540. The status text field 540 can be pre-populated in some embodiments with affinity data 126 and/or collected data 118 that can be used to generate the affinities 120 and/or associated affinity data 126. Thus, the status text field 540 shown in FIG. 5D can include information describing an event (e.g., a meeting to talk about a charitable cause), one or more people associated with the event (e.g., Eustice Jackson), and mood information such as, for example, an indication that the user or other entity is "calm." Other moods can be displayed as illustrated and described herein. Other types of affinity data 126 and/or collected data 118 can be displayed as well, for example, location information, weather information, music being listened to, food or drink being consumed, a place of business at which the user or other entity is located, a transaction occurring, or the like. It can be appreciated that a user or other entity can modify the text and/or tags in the status text field 540 to thereby modify the status update. Because various types of information that can be collected and/or displayed (e.g., the affinity data 126 and the collected data 118) have been illustrated and described herein, only some examples are shown in FIG. 5D.

It therefore should be understood that the illustrated status text field 540 and the pre-populated information shown therein are illustrative and should not be construed as being limiting in any way.

The social networking status update window 534 also can include a UI control 542. The UI control 542 can be selected to cause the user device 108 to submit the status update to an associated social networking service or the like. The social networking status update window 534 also can include a UI control 544. The UI control 544 can be selected to edit the status update. Thus, while the text of the status update may be edited via the status text field 540, selection of the UI control 544 can cause the user device 108 to display additional editing capabilities such as adding or removing people to "tag" them, adding or removing the mood information, adding or removing geographic location information, adding or removing references, combinations thereof, or the like. The social networking status update window 534 also can include a UI control 546. The UI control 546 can be selected to cause the user device 108 to cancel the status update. It therefore can be appreciated that selection of one of the UI controls 542, 544, 546 can, but does not necessarily, cause the user device 108 to hide the social networking status update window 534. Because additional or alternative controls can be included in the screen display 500D, it should be understood that the example embodiment shown in FIG. 5D is illustrative and therefore should not be construed as being limiting in any way.

Figure 5E:
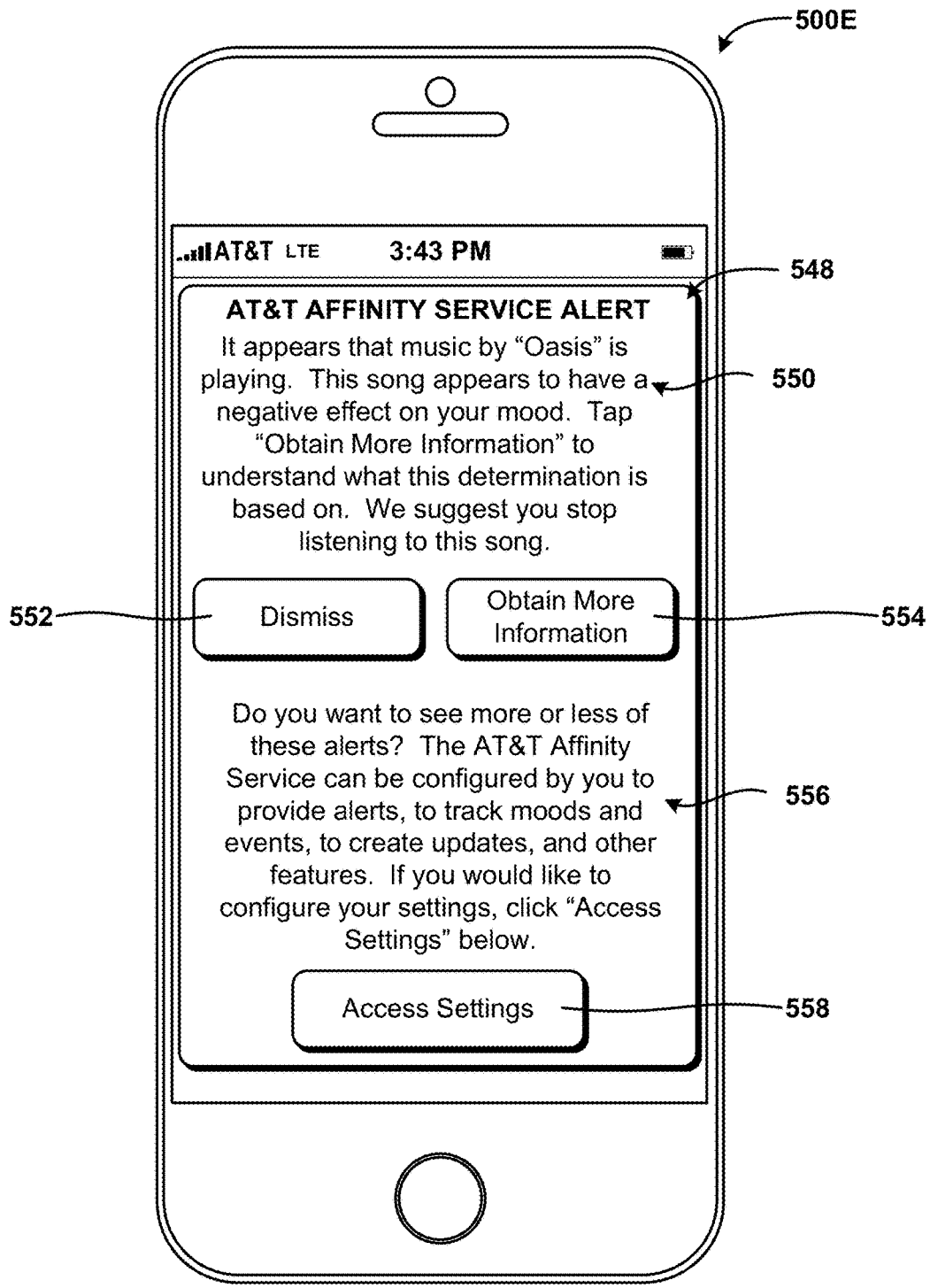

Referring now to FIG. 5E, a UI diagram showing additional aspects of some of the concepts and technologies disclosed herein for providing and/or using an affinity service 106 and/or the affinity application 112 is described in detail. In particular, FIG. 5E shows an illustrative screen display 500E. According to some embodiments of the concepts and technologies described herein, the screen display 500E can be generated by a device such as the user device 108 via interactions with the affinity service 106 and/or the affinity application 112. In particular, according to various embodiments, the user device 108 can generate the screen display 500E and/or other screen displays in conjunction with and/or based upon interactions with the affinity application 112 described herein, which can be configured to render the screen display 500E using data generated at the user device 108 and/or using data provided by the affinity service 106. It should be appreciated that the UI diagram illustrated in FIG. 5E is illustrative of one contemplated example of the UIs that can be generated and/or displayed in accordance with the concepts and technologies disclosed herein, and therefore should not be construed as being limited in any way.

According to various embodiments, the screen display 500E can be presented, for example, when affinity data 126 is received by the user device 108 (e.g., prompted by detected events at the user device 108). Because the screen display 500E illustrated in FIG. 5E can be displayed at additional and/or alternative times, it should be understood that these examples are illustrative and therefore should not be construed as being limiting in any way. The screen display 500E can include an alert screen 548. The alert screen 548 can be configured to provide the affinity data 126 illustrated and described herein to a user or other entity. In some embodiments, the alert screen 548 can be presented in response to detecting an event or condition at the user device 108 (or other device associated with the user or other entity). The alert screen 548 can include various types of data and/or information that can be included in the affinity data 126.

As illustrated and described herein, the alert screen 548 can provide an indication 550. The indication 550 can explain that some event or condition information has prompted generation of the alert screen 548. In the illustrated embodiment, the indication 550 can indicate that music by a particular artist has been detected at or proximate to an environment 116 associated with the user device 108 (or other device). The indication 550 also can provide mood information (or other affinity data 126). In the illustrated embodiment, the indication 550 indicates that music by a particular artist has been detected and that the user's or other entity's mood tends to be negatively affected by hearing this music (based on the affinity data 126). The indication 550 also includes a suggestion in the illustrated embodiment, though this suggestion is not necessarily included in all embodiments of the screen display 500E. The suggestion can suggest to the user or other entity how a mood can be improved, in this case by avoiding listing to the music detected. This suggestion can also be based upon the affinity data 126. It should be understood that this example is illustrative and therefore should not be construed as being limiting in any way.

The alert screen 548 also can include a UI control 552 to dismiss the alert screen 548. Thus, for example, the user or other entity can select the UI control 552 to close the alert screen 548 when the desired information has been obtained via the alert screen 548, when the user or other entity wishes to close the alert screen 548 for other reasons, and/or at other times at which the UI control 552 is selected. The alert screen 548 also can include a UI control 554 for obtaining more information relating to the indication 550 and/or the suggestion. Selection of the UI control 554 can cause the user device 108 to present additional and/or alternative affinity information that relates to the event. Thus, selection of the UI control 554 can cause the user device 108 to obtain additional affinity data 126 that can explain the indication 550 and/or the suggestion based upon events, conditions; mood and/or history information associated with a user or other entity associated with the user device 108 and the location, time, participant, condition, or the like; other information; combinations thereof; or the like.

The alert screen 548 also can include a prompt 556. The prompt 556 can inform a user or other entity about alerts that may be available and/or how the affinity service 106 operates. In the illustrated embodiment, the alert screen 548 also includes a UI control 558 to access settings associated with the affinity service 106 and/or the affinity application 112. Thus, selection of the UI control 558 can cause the user device 108 to present settings for generating alerts, tracking moods, detecting events, combinations thereof, or the like. It can be appreciated that selection of the UI control 558 also can cause the user device 108 to hide the alert screen 548, though this is not necessarily the case. Because additional or alternative controls can be included in the alert screen 548, it should be understood that the example embodiment shown in FIG. 5E is illustrative and therefore should not be construed as being limiting in any way.

Figure 5F:
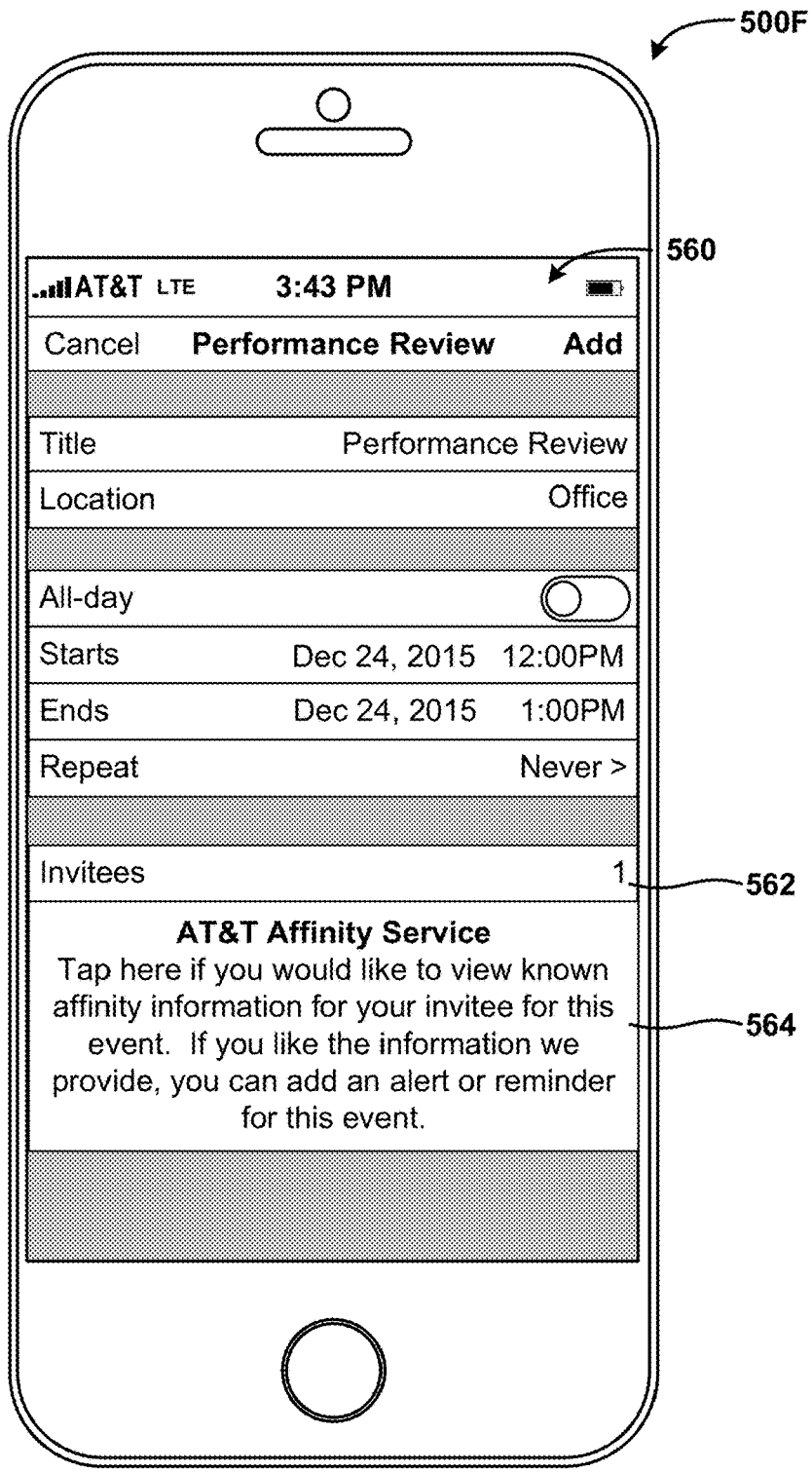

Referring now to FIG. 5F, a UI diagram showing additional aspects of some of the concepts and technologies disclosed herein for providing and/or using an affinity service 106 and/or the affinity application 112 is described in detail. In particular, FIG. 5F shows an illustrative screen display 500F. According to some embodiments of the concepts and technologies described herein, the screen display 500F can be generated by a device such as the user device 108 via interactions with the affinity service 106 and/or the affinity application 112. In particular, according to various embodiments, the user device 108 can generate the screen display 500F and/or other screen displays in conjunction with and/or based upon creating a calendar event. The user device 108 (and/or the affinity application 112 executed thereby) can be configured to detect creation of the calendar event and obtain affinity data 126 that relates to the calendar event (or some aspect thereof). The user device 108 can render the screen display 500F using data generated at the user device 108 and/or using data provided by the affinity service 106. It should be appreciated that the UI diagram illustrated in FIG. 5F is illustrative of one contemplated example of the UIs that can be generated and/or displayed in accordance with the concepts and technologies disclosed herein, and therefore should not be construed as being limited in any way.

According to various embodiments, the screen display 500F can be presented, for example, when affinity data 126 is received by the user device 108 (e.g., prompted by creation of a calendar event at or in association with the user device 108). Because the screen display 500F illustrated in FIG. 5F can be displayed at additional and/or alternative times, it should be understood that these examples are illustrative and therefore should not be construed as being limiting in any way. The screen display 500F is illustrated as including a create event screen 560. The create event screen 560 can be configured to enable creation of a calendar event. Because the creation of calendar events generally is understood, some of the illustrated fields and/or controls will not be further described herein.

As illustrated and described herein, the create event screen 560 can include a field 562 for specifying invitees or participants of the calendar event. As shown in FIG. 5F, one invitee or participant (in addition to the user or other entity) has been specified. The affinity application 112 can, in response to detecting creation of the calendar event, obtain affinity data 126 that relates to any aspect of the event (e.g., location, time, date, title, participants, etc.). In the illustrated embodiment, the affinity application 112 can detect the specification of the invitee or participant, and obtain affinity data 126 relating to the invitee or participant. It should be understood that this example is illustrative and therefore should not be construed as being limiting in any way.

The create event screen 560 can include an affinity alert field 564. The affinity alert field 564 can be displayed anywhere within the create event screen 560, as an overlay for the create event screen 560, as a window within the screen display 500F, and/or elsewhere. In some embodiments, the affinity alert field 564 is displayed proximate to the field with which the affinity alert is associated (in this case the field 562 for specifying an invitee). It should be understood that this example is illustrative and therefore should not be construed as being limiting in any way.

The affinity alert field 564 can explain that some event or condition information has prompted generation of the affinity alert field 564. In the illustrated embodiment, the affinity alert field 564 can indicate that the specified invitee or participant is represented by the affinities 120 and/or other information that may be included in the affinity data 126. In the illustrated embodiment, the affinity alert field 564 indicates that information relating to this invitee or participant is available.

According to various embodiments, the affinity alert field 564 can also act as a UI control that, when selected, causes the user device 108 to present affinity information that relates to the invitee or participant. Thus, input that corresponds to selection of the affinity alert field 564 can cause the user device 108 to obtain affinity data 126 that can provide insights into the invitee or participant, as well as how that invitee or participant can affect a mood associated with the user or other entity. In some embodiments, selection of the affinity alert field 564 can cause the user device 108 to display a screen display or other graphical elements that can present information that may be similar to the screen display 500A illustrated and described herein with reference to FIG. 5A, though that is not necessarily the case. Because additional or alternative controls can be included in the create event screen 560, it should be understood that the example embodiment shown in FIG. 5F is illustrative and therefore should not be construed as being limiting in any way.

Figure 5G:
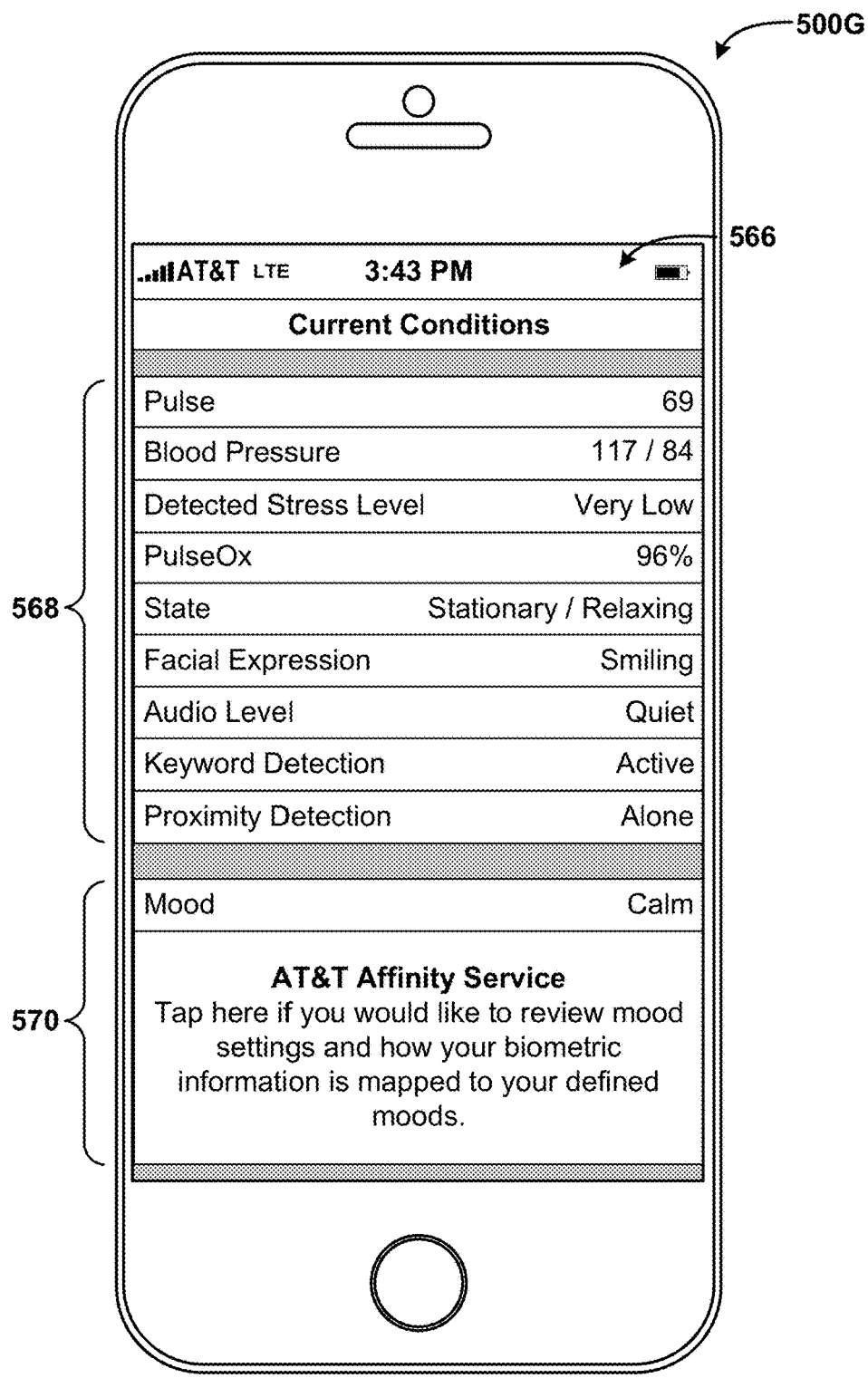

Referring now to FIG. 5G, a UI diagram showing additional aspects of some of the concepts and technologies disclosed herein for providing and/or using an affinity service 106 and/or the affinity application 112 is described in detail. In particular, FIG. 5G shows an illustrative screen display 500G. According to some embodiments of the concepts and technologies described herein, the screen display 500G can be generated by a device such as the user device 108 via interactions with the affinity service 106 and/or the affinity application 112. In particular, according to various embodiments, the user device 108 can generate the screen display 500G and/or other screen displays in conjunction with and/or based upon defining or creating defined moods.

As mentioned above, a "mood" can be subjective, and as such, the concepts and technologies described herein can provide for defining "moods" and/or defining criteria for projecting "moods" based upon objective data, as will be explained in more detail below. Because the screen display 500G can be presented at additional and/or alternative times, it should be understood that the above examples are illustrative and therefore should not be construed as being limiting in any way. It also should be appreciated that the UI diagram illustrated in FIG. 5G is illustrative of one contemplated example of the UIs that can be generated and/or displayed in accordance with the concepts and technologies disclosed herein, and therefore should not be construed as being limited in any way.

The screen display 500G is illustrated as including a condition display screen 566. The condition display screen 566 can be configured to display conditions associated with the user or other entity. Thus, the conditions at the environment 116 can be displayed by the condition display screen 566. It can be appreciated from the description herein that the conditions displayed by the condition display screen 566 can correspond, in some embodiments, to the collected data 118 illustrated and described herein. It should be understood that this example is illustrative and therefore should not be construed as being limiting in any way.

As illustrated and described herein, the condition display screen 566 can include a detected condition portion 568. The detected condition portion 568 can display any number of detected conditions including, but not limited to, biometric data (e.g., heart rate, blood pressure, oxygen saturation, detected stress level such as variations in other biometric data), detected states (e.g., whether the user is stationary, sitting, standing, moving, walking, running, driving, or the like), facial expressions (which can be collected from an onboard imaging device or an off-board device 114 such as a camera or the like), an audio level (e.g., a decibel level at or near the environment 116), keyword data (e.g., defining keywords that, if detected at the environment 116, can indicate a mood), proximity information (e.g., people or things at or near the user or other entity), combinations thereof, or the like. In some embodiments, these and other conditions can be used to set moods and/or to define moods, though this is not necessarily the case.

The condition display screen 566 can also include a mood indication portion 570. The mood indication portion 570 can indicate a current mood. The mood can be defined via various settings and/or configurations (as will be explained in more detail below with reference to FIG. 5H) as explained in FIG. 1 with regard to the mood data 130. The mood indication portion 570 also can include a UI control that, when selected, provides mood settings. An example embodiment of a mood setting screen that can be displayed in response to detecting selection of the UI control included in the mood indication portion 570 will be illustrated and described in detail below with reference to FIG. 5H. Because additional or alternative controls can be included in the condition display screen 566, it should be understood that the example embodiment shown in FIG. 5G is illustrative and therefore should not be construed as being limiting in any way.

Figure 5H:
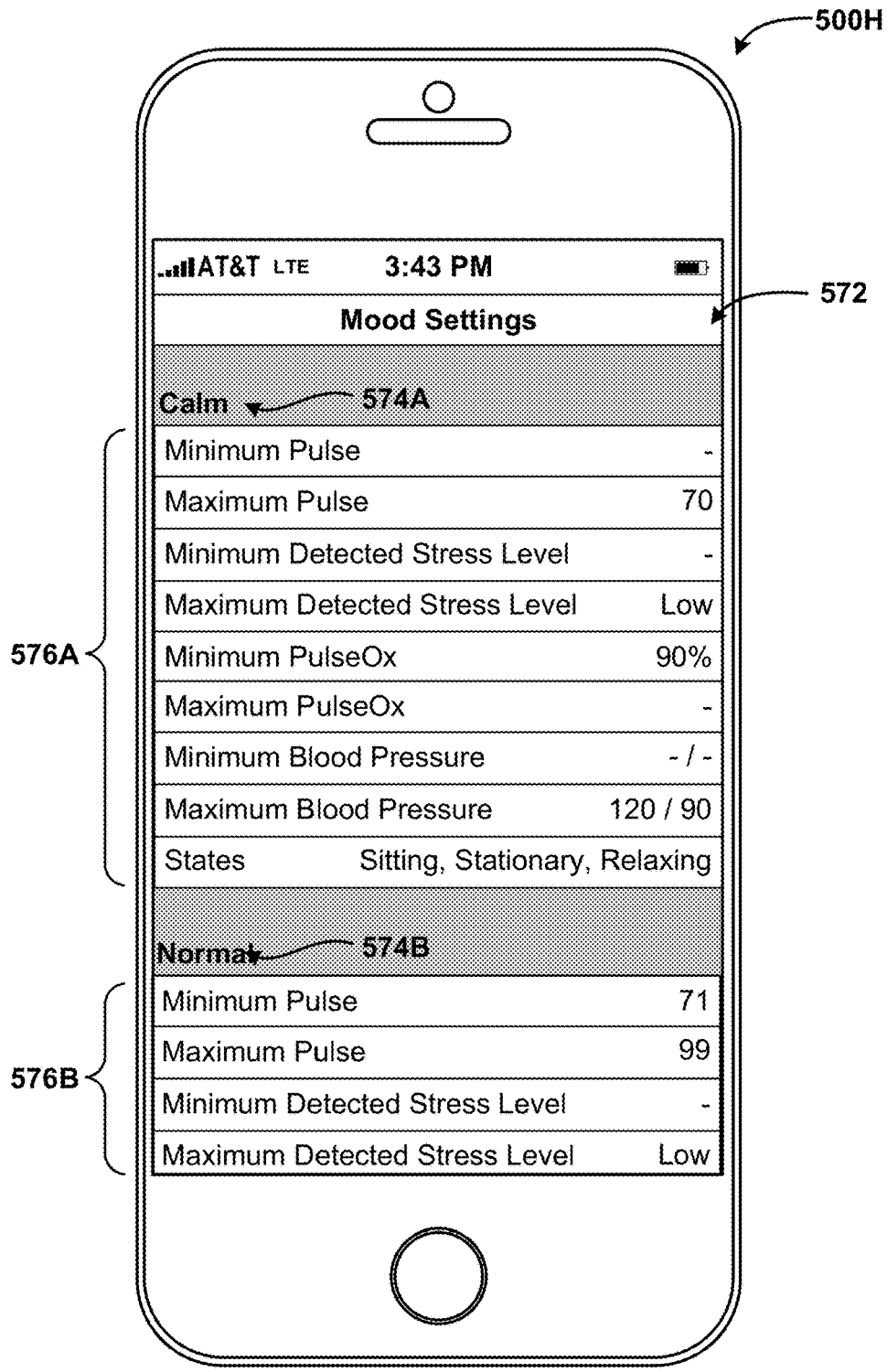

Referring now to FIG. 5H, a UI diagram showing additional aspects of some of the concepts and technologies disclosed herein for providing and/or using an affinity service 106 and/or the affinity application 112 is described in detail. In particular, FIG. 5H shows an illustrative screen display 500H. According to some embodiments of the concepts and technologies described herein, the screen display 500H can be generated by a device such as the user device 108 via interactions with the affinity service 106 and/or the affinity application 112. In particular, according to various embodiments, the user device 108 can generate the screen display 500H and/or other screen displays in conjunction with and/or based upon defining or creating defined moods.

In the illustrated embodiment, the screen display 500H can be presented, for example, in response to detecting a request to define moods and/or objective data that will be used to define the moods. For example, the screen display 500H can be presented in response to detecting an interaction with the UI control illustrated and described above with reference to the mood indication portion 570 in FIG. 5G, though this is not necessarily the case. Because the screen display 500H can be presented at additional and/or alternative times, it should be understood that this example is illustrative and therefore should not be construed as being limiting in any way. Also, it should be understood that the UI diagram illustrated in FIG. 5H is illustrative of one contemplated example of the UIs that can be generated and/or displayed in accordance with the concepts and technologies disclosed herein, and therefore should not be construed as being limited in any way.

The screen display 500H is illustrated as including a mood settings screen 572. The mood settings screen 572 can be configured to display various settings, conditions, condition ranges, and/or other factors that can be used to detect or project a mood in accordance with the concepts and technologies described herein. As such, it can be appreciated that the mood settings screen 572 can be used to generate and/or modify the mood data 130, though this is not necessarily the case.

As shown in FIG. 5H, a first mood title 574A can indicate and/or identify a defined mood for which settings and/or conditions in the first condition definition portion 576A are defined. Thus, in the context of FIG. 5H, the settings and/or conditions in the first condition definition portion 576A can define a "calm" mood. Similarly, settings and/or conditions in the second condition definition portion 576B can define a "normal" mood as defined in the second mood title 574B. It should be understood that these examples are illustrative and therefore should not be construed as being limiting in any way.

As illustrated and described herein, a diverse set of conditions, condition ranges, and the like can be understood to define a mood associated with a user or other entity. Not all of these conditions, condition ranges, or the like are illustrated in FIG. 5H. Thus, while the mood of a particular user or other entity may be affected by geographic location, date, time of day, places of business, music, food or drink being consumed, presence or absence of certain individuals or things; these and other conditions illustrated and described herein are not shown in FIG. 5H for simplicity. Clearly, however, these and other aspects of the concepts and technologies described herein can be included in various embodiments of the screen display 500H.

As illustrated and described herein, a user or other entity can define one or more ranges associated with biometric data (e.g., pulse rate, oxygen saturation, stress levels, blood pressures) and/or states can be defined. According to various embodiments of the concepts and technologies described herein, a range may specify one, both, or neither of a minimum and maximum. In the illustrated embodiment, for example, a calm mood can be defined (at least in part) by having less than a maximum heart rate of 70 beats per minute, having an oxygen saturation of 90% or higher, having a blood pressure of 120/90 or lower, or the like. It should be understood that this example is illustrative and therefore should not be construed as being limiting in any way. The ranges illustrated in FIG. 5H can be defined by the user or other entity.

According to various embodiments of the concepts and technologies described herein, the user or other entity can use the screen display 500G illustrated and described with reference to FIG. 5G to determine these ranges. In some other embodiments, the affinity service 106 and/or the affinity application 112 can be configured to periodically poll various sensors (e.g., the sensors 110 and/or the off-board devices 114) to collect these and other data, and ask a user or other entity for a mood at that time. These and other types of information can be stored as the mood data 130 illustrated and described herein. Because the ranges can be defined in additional and/or alternative manners, it should be understood that these examples are illustrative and therefore should not be construed as being limiting in any way.

At any rate, by defining various conditions and an associated mood, the affinity service 106 and/or the affinity application 112 can be configured to determine or project, based upon the collected data 118 at any given time, a mood associated with the user or other entity. Thus, when an event is detected and/or at other times, the affinity service 106 and/or the affinity application 112 can obtain collected data 118 and determine, based upon the collected data 118 and various mood indications stored as part of the affinities 120, a mood or projected mood associated with the user or other entity. It should be understood that this example is illustrative and therefore should not be construed as being limiting in any way.

Although discussed above in detail in various places, it should be noted that various embodiments of the concepts and technologies described herein can be used to enable aggregation of affinities 120 by any type and/or category of information included in (or associated with) the affinities 120. Thus, various embodiments of the concepts and technologies described herein can enable categorization and storage of the affinities 120 based upon events, types of events, categories of events, conditions, types of conditions, categories of conditions, moods, locations, parties, devices, combinations thereof, or the like. Thus, as explained above, the affinities 120 can be catalogued, stored, and/or searched based upon any information included in and/or associated with the affinities 120. It should be understood that this example is illustrative and therefore should not be construed as being limiting in any way.

Time information can be a condition and/or may be used to interpret conditions. For example, a time duration at a particular location, involved in a particular transaction, in the company of a particular person, etc. may be detected. If the time duration is less than a defined threshold, the condition (with which the time duration is associated) can be determined not to have an impact on the mood. If the time duration exceeds the specified threshold, the condition can be determined to have an impact on the mood. In some embodiments, the time thresholds may be configured to only apply to some conditions as some conditions may immediately impact mood (e.g., certain activities, certain people, etc.). According to various embodiments, the threshold can be defined as thirty seconds, one minute, five minutes, ten minutes, or other time thresholds.

Figure 6:
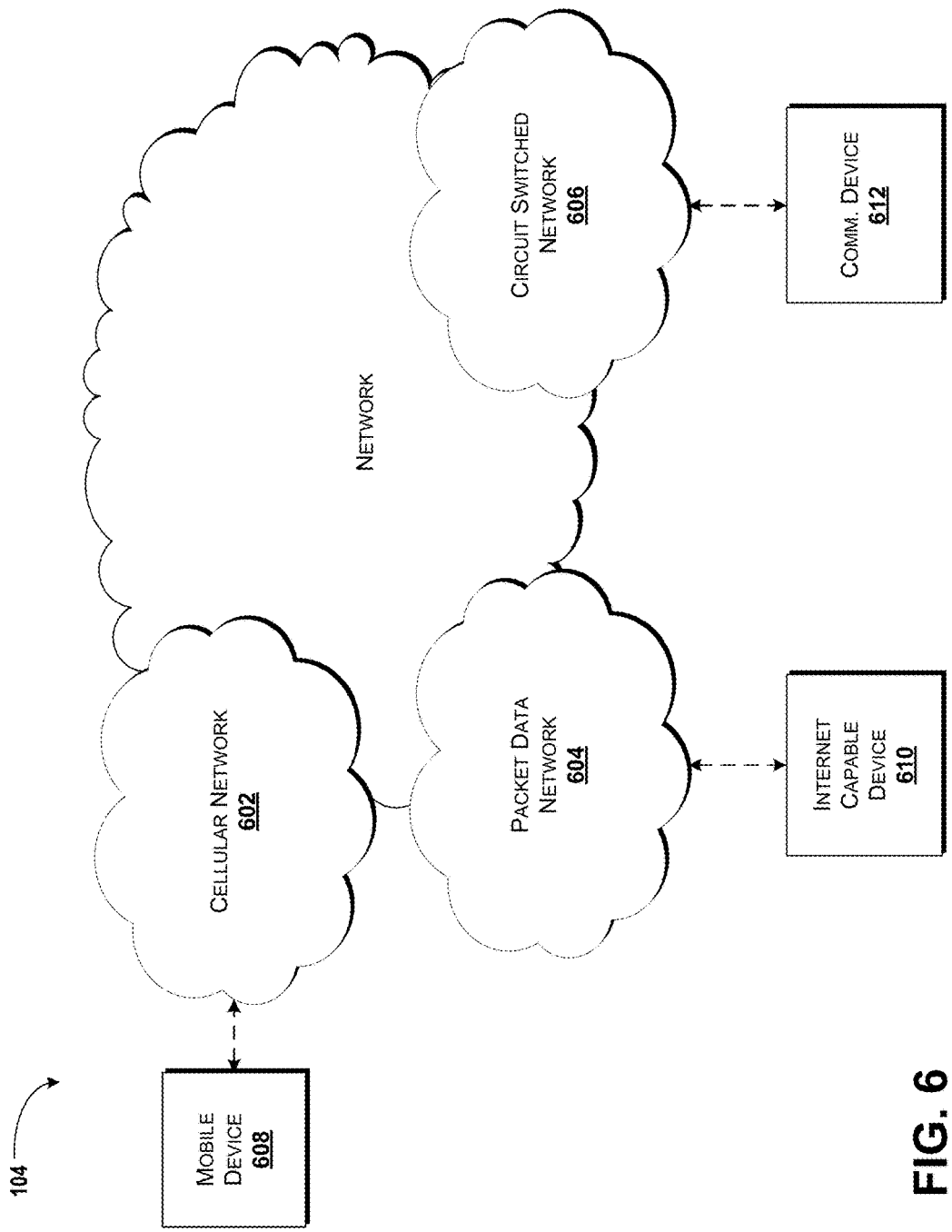
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
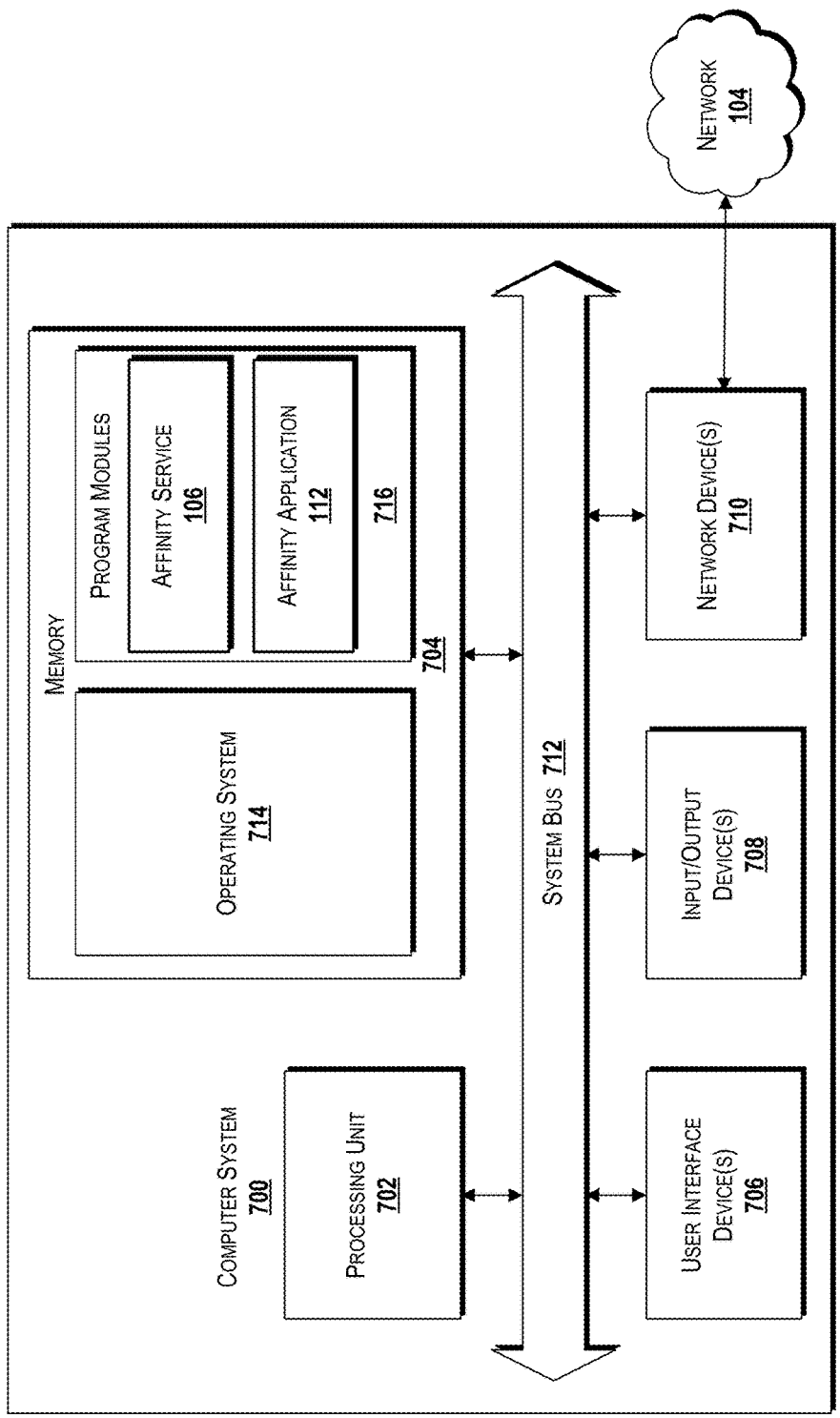
FIG. 7 is a block diagram illustrating an example computer system configured to detect and use mood-condition affinities, according to some illustrative embodiments of the concepts and technologies described herein.

FIG. 7 is a block diagram illustrating a computer system 700 configured to provide the functionality described herein for detecting and using mood-condition affinities, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the affinity service 106 and the affinity application 112. This and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the collected data 118, affinities 120, the affinity data 126, mood data 130, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
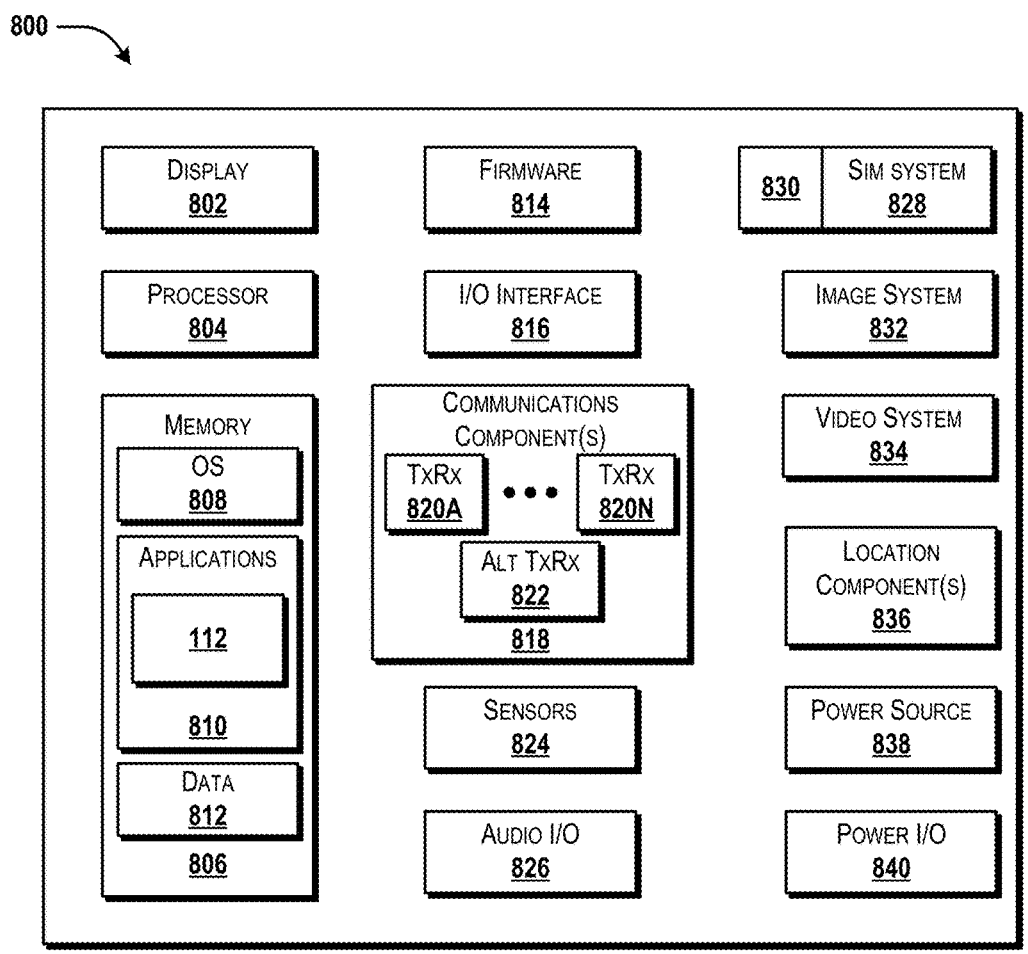
FIG. 8 is a block diagram illustrating an example mobile device configured to detect and use mood-condition affinities and/or to interact with the affinity service, according to some illustrative embodiments of the concepts and technologies described herein.

Turning now to FIG. 8, an illustrative mobile device 800 and components thereof will be described. In some embodiments, the user device 108 described above with reference to FIGS. 1-7 can be configured as and/or can have an architecture similar or identical to the mobile device 800 described herein in FIG. 8. It should be understood, however, that the user device 108 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements for creating mood definitions, viewing current mood information, viewing affinities 120, viewing alerts relating to affinities 120, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the affinity application 112, other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, defining moods, viewing mood definitions, viewing alerts generated by the affinity service 106, viewing and/or editing social networking updates, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the affinity application 112 and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the collected data 118, affinities 120, the affinity data 126, mood data 130, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for detecting and using mood-condition affinities have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system comprising: a processor; and
   a memory that stores computer-executable instructions that, when executed by the processor, cause the processor to perform operations comprising
   obtaining mood information associated with a user of a user device, the mood information comprising biometric information,
   defining, based on the mood information, a plurality of moods for the user,
   obtaining, from the user device, collected data comprising sensor readings collected by the user device, wherein the sensor readings comprise
     a first sensor reading that relates to an environment of the user device, and
     a second sensor reading that relates to the user, wherein the second sensor reading comprises audio captured by a microphone of the user device,
   determining, based on the first sensor reading, a condition in the environment of the user device,
   determining, based on the second sensor reading, a mood associated with the user, wherein determining the mood comprises detecting, in the audio captured by the microphone, keywords in spoken words represented by the audio and determining, based on the keywords, the mood, generating an affinity that defines a relationship between the condition and the mood, and storing the affinity at a data storage device.

2. The system of claim 1, wherein the computer-executable instructions, when executed by the processor, cause the processor to perform operations further comprising:

detecting an event occurring at the user device, the event comprising a change in state associated with the user; and requesting the collected data in response to detecting the event.

3. The system of claim 1, further comprising sensors located at the user device and off-board devices in communication with the user device, wherein the off-board devices comprise a camera, and wherein the sensors comprise biometric sensors.

4. The system of claim 1, wherein the second sensor reading comprises biometric data, and wherein determining the mood comprises identifying one of the plurality of moods that comprises biometric information that relates to the biometric data.

5. The system of claim 1, wherein the computer-executable instructions, when executed by the processor, cause the processor to perform operations further comprising:

receiving, from a requestor, a request for affinity data;

determining a further condition that is associated with the requestor;

identifying a further affinity associated with the further condition; and providing the affinity data to a recipient, the affinity data being based upon the further affinity.

6. The system of claim 1, wherein the computer-executable instructions, when executed by the processor, cause the processor to perform operations further comprising:

generating a social networking status update; and providing the social networking status update to a device that hosts a social networking service, wherein the social networking status update relates to the user and indicates mood.

7. The system of claim 5, wherein providing the affinity data to the recipient comprises providing an alert to the recipient, wherein the alert relates to an event associated with the requestor, and wherein the alert indicates a predicted mood of the user based on a projected condition.

8. The system of claim 1, wherein the first sensor reading comprises the audio captured by the microphone, and wherein determining the condition comprises recognizing, in the audio captured by the microphone, music in the environment.

9. A computer storage medium having computer-executable instructions stored thereon that, when executed by a processor, cause the processor to perform operations comprising:

obtaining mood information associated with a user of a user device, the mood information comprising biometric information;

defining, based on the mood information, a plurality of moods for the user;

obtaining, from the user device, collected data comprising sensor readings collected by the user device, wherein the sensor readings comprise a first sensor reading that relates to an environment of the user device, and a second sensor reading that relates to the user, wherein the second sensor reading comprises audio captured by a microphone of the user device;

determining, based on the first sensor reading, a condition in the environment of the user device;

determining, based on the second sensor reading, a mood associated with the user, wherein determining the mood comprises detecting, in the audio captured by the microphone, keywords in spoken words represented by the audio and determining, based on the keywords, the mood;

generating an affinity that defines a relationship between the condition and the mood; and storing the affinity at a data storage device.

10. The computer storage medium of claim 9, wherein the second sensor reading comprises biometric data, and wherein determining the mood comprises identifying one of the plurality of moods that comprises biometric information that relates to the biometric data.

11. The computer storage medium of claim 9, wherein the computer-executable instructions, when executed by the processor, cause the processor to perform operations further comprising:

receiving, from a requestor, a request for affinity data; determining a further condition that is associated with the requestor; identifying a further affinity associated with the further condition; and providing the affinity data to a recipient, the affinity data being based upon the further affinity.

12. The computer storage medium of claim 11, wherein receiving the request for the affinity data comprises:

obtaining further collected data from the requestor; determining the further condition; and determining, by the processor and based on the further condition, that the affinity data should be provided to the recipient.

13. A method comprising:

obtaining, at a processor that executes an affinity service, mood information associated with a user of a user device, the mood information comprising biometric information;

defining, by the processor and based on the mood information, a plurality of moods for the user;

obtaining collected data comprising sensor readings collected by the user device, wherein the sensor readings comprise a first sensor reading that relates to an environment of the user device, and a second sensor reading that relates to the user, wherein the second sensor reading comprises audio captured by a microphone of the user device;

determining, by the processor and based on the first sensor reading, a condition in the environment of the user device;

determining, by the processor and based on the second sensor reading, mood associated with the user, wherein determining the mood comprises detecting, in the audio captured by the microphone, keywords in spoken words represented by the audio and determining, based on the keywords, the mood;

generating, by the processor, an affinity that defines a relationship between the condition and the mood; and storing, by the processor, the affinity at a data storage device.

14. The method of claim 13, wherein the second sensor reading comprises biometric data, and wherein determining the mood comprises identifying one of the plurality of moods that comprises biometric information that relates to the biometric data.

15. The method of claim 13, further comprising:
receiving, by the processor and from a requestor, a request for affinity data;
determining, by the processor, a further condition that is associated with the requestor;
identifying, by the processor, a further affinity associated with the further condition; and
providing, by the processor, the affinity data to a recipient, the affinity data being based upon the further affinity.

16. The method of claim 13, further comprising:
generating a social networking status update; and
providing the social networking status update to a device that hosts a social networking service, wherein the social networking status update relates to the user and indicates mood.

17. The method of claim 15, wherein providing the affinity data to the recipient comprises providing an alert to the recipient, wherein the alert relates to an event associated with the requestor and wherein the alert indicates a predicted mood of the user based on a projected condition.

18. The method of claim 15, wherein receiving the request for the affinity data comprises:
obtaining, by the processor, further collected data from the requestor;
determining, by the processor, the further condition; and
determining, by the processor and based on the further condition, that affinity data should be provided to the recipient.

* * * * *